United States Patent
Ohta

(10) Patent No.: US 7,674,167 B2
(45) Date of Patent: Mar. 9, 2010

(54) STORAGE MEDIUM STORING TRAVELING TIME CALCULATION PROGRAM AND GAME APPARATUS

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1554 days.

(21) Appl. No.: 10/921,897

(22) Filed: Aug. 20, 2004

(65) Prior Publication Data

US 2005/0096136 A1 May 5, 2005

(30) Foreign Application Priority Data

Nov. 5, 2003  (JP)  ............................... 2003-376120

(51) Int. Cl.
*A63F 9/14* (2006.01)
(52) U.S. Cl. ............................................ 463/6; 463/59
(58) Field of Classification Search ................ 463/6, 463/2–4, 59
See application file for complete search history.

(56) References Cited

U.S. PATENT DOCUMENTS

| | | | | |
|---|---|---|---|---|
| 5,214,504 A * | 5/1993 | Toriu et al. | ............. | 375/240.02 |
| 5,872,604 A * | 2/1999 | Ogura | ...................... | 348/699 |
| 6,208,760 B1 * | 3/2001 | De Haan et al. | ............. | 382/236 |
| 6,980,207 B2 * | 12/2005 | Yamamoto et al. | .......... | 345/419 |
| 2003/0109295 A1 * | 6/2003 | Baba | ............................ | 463/4 |
| 2003/0130031 A1 * | 7/2003 | Yoshida et al. | ................ | 463/23 |

FOREIGN PATENT DOCUMENTS

| | | |
|---|---|---|
| JP | 2000-342846 | 12/2000 |
| JP | 3403506 | 2/2003 |

\* cited by examiner

*Primary Examiner*—James S McClellan
(74) *Attorney, Agent, or Firm*—Nixon & Vanderhye P.C.

(57) ABSTRACT

A traveling time calculation program causes a computer to function as the following: position determination programmed logic circuitry which determines a position of a movable object using a velocity vector with every update of a game screen, virtual position setting programmed logic circuitry which sets a virtual position between positions immediately before and after the movable object passes through a second position, and shifts the virtual position using an infinitesimal unit vector obtained by dividing a velocity vector at the position immediately before the movable object passes through the second position into predetermined numbers, and traveling time calculation programmed logic circuitry which calculates a traveling time from the first position to a position immediately before or after the virtual position crosses the second position.

24 Claims, 18 Drawing Sheets

F I G. 2
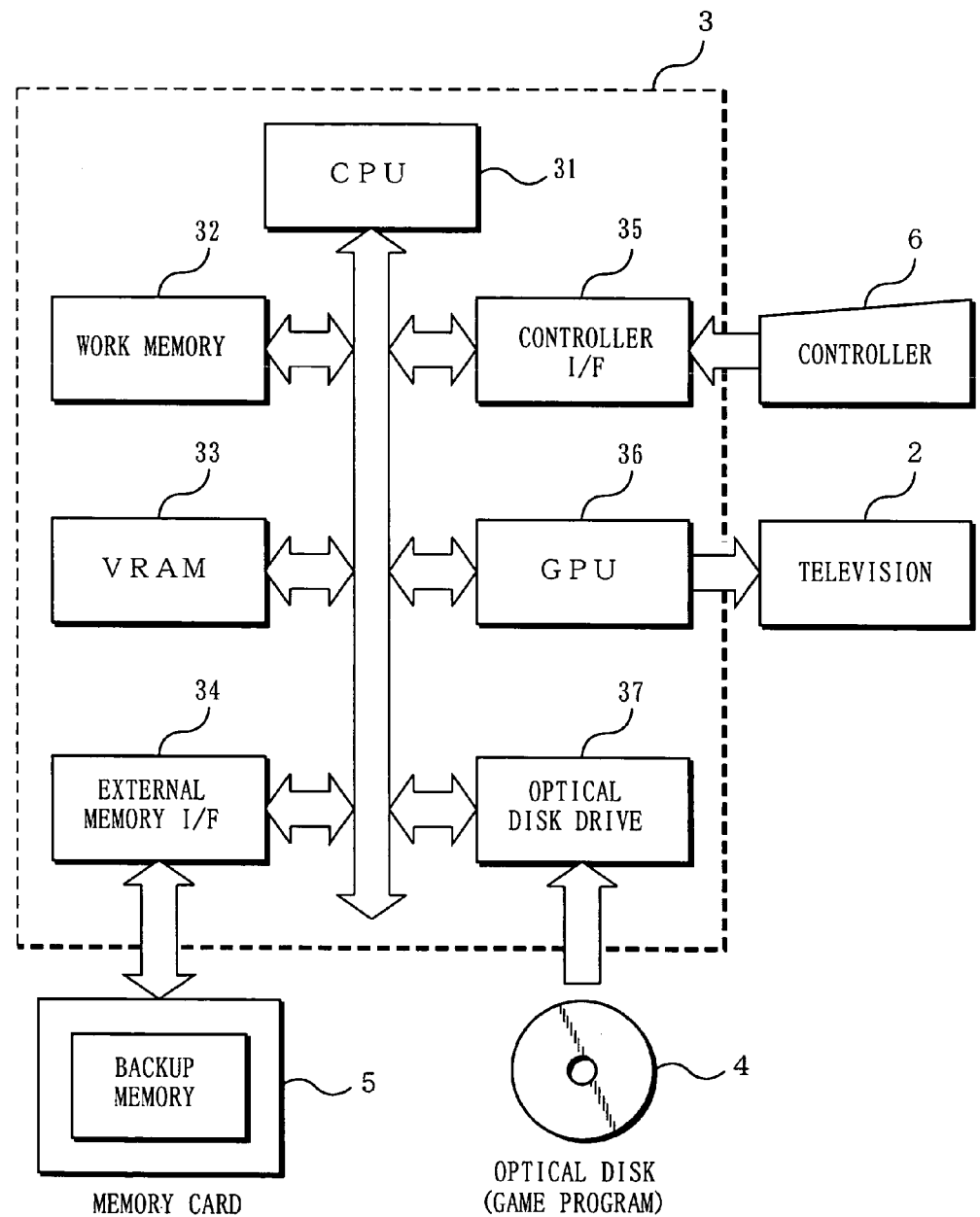

F I G. 1 5
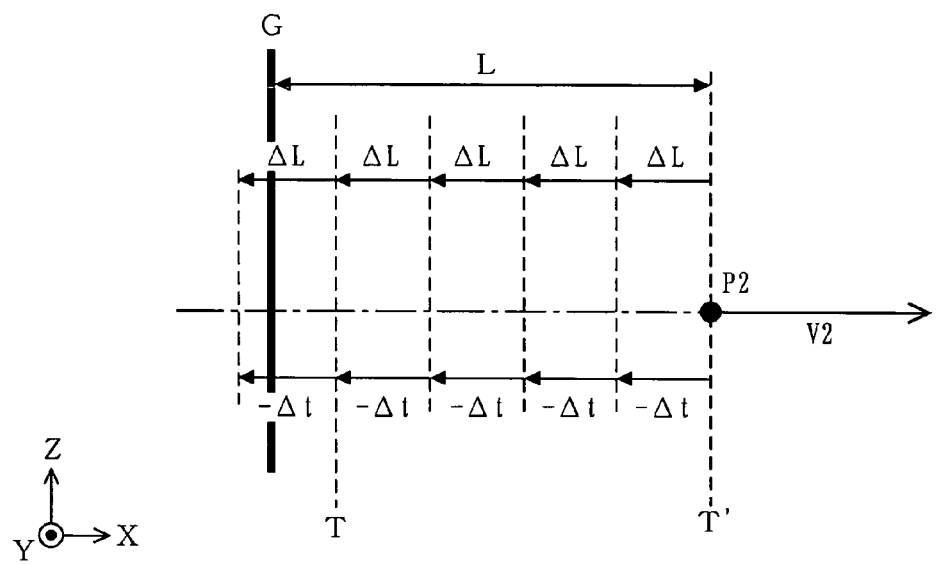

STORAGE MEDIUM STORING TRAVELING TIME CALCULATION PROGRAM AND GAME APPARATUS

BACKGROUND AND SUMMARY

Field

The illustrative embodiments relate to a traveling time calculation program for calculating the traveling time required by a movable object to arrive at one point in a game space. More particularly, the illustrative embodiments relate to a traveling time calculation program for calculating the traveling time of the movable object to an accuracy of less than a unit time during which a game screen is updated.

There are many television games that allow a player(s) to compete in car racing by displaying both the racing cars operated by the player(s) and a racecourse on a screen. An objective of a racing game is to arrive at a goal as fast as possible. Thus, in a typical racing game, a time (goal time), at which a racing car has arrived at the goal, is measured when the racing car crosses a goal line and is displayed on the screen. Typically, the goal time is calculated using a unit time (frame time), by which the game screen is updated, as a unit. In general, this frame time is 1/60 sec. Thus, it is impossible to measure the goal time to an accuracy of less than 1/60 sec in a general racing game.

The illustrative embodiments present a method for measuring a goal time to an accuracy of less than a frame time. FIG. 16 is an illustration for describing a conventional method for measuring a goal time. In Japanese Patent No. 3403506, a time T1 at which a racing car arrives at a goal G', which is used for calculation, is calculated by calculating a ratio between a distance L' and a distance L, as shown in FIG. 16. The distance L' indicates a distance between a timekeeping point P and the calculation goal G', and the distance L indicates a distance between an actual goal G and the calculation goal G'. Specifically, the time T1 at which a racing car arrives at the calculation goal G' is calculated using the following two equations (1) and (2):

$$T1 = n/60 + t \quad (1)$$

$$L : (1/60) = (L - L') : t \quad (2)$$

In the equations (1) and (2), a time (n/60) indicates a time at which a racing car arrives at a measurement point P (timekeeping point) in a game course 91. Also, a time t indicates the traveling time from the timekeeping point P to the calculation goal G'. Note that it is possible to calculate a time T2 at which a racing car arrives at the actual goal G in a manner similar to the above-described method.

Based on the above-described method, it is possible to calculate the time T1 or T2 to an accuracy of less than 1/60 sec. However, the above-described method requires a prolonged time for calculating a goal time, due to the fact that the calculation uses a ratio. Thus, in a game apparatus with poor CPU performance, the time necessary for performing a goal time calculation process is increased, which results in an occurrence of a time lag in displaying the goal time on the screen.

Here, a cause of the prolonged time necessary for a calculation process is that the calculation that uses a ratio includes multiplication and division. FIG. 17 is a flowchart showing a flow of a multiplication process. FIG. 18 is a flowchart showing a flow of a division process. In FIG. 17, a multiplication such as (multiplier)×(multiplicand)=(product), for example, is performed as follows: First, in the case where the last bit of a multiplier is 1, a multiplicand is added to a product (steps 81 and 82). Next, the multiplicand is shifted to the left by one bit (step 83). Next, the multiplier is shifted to the right by one bit (step 84). The above-described process is repeated N times (N is a bit number of the multiplier) (steps 85 and 86), whereby a product is calculated.

On the other hand, in FIG. 18, a division such as (dividend)/(divisor)=(quotient) is performed as follows: First, a divisor is shifted to the left by N bit (N is a bit number of the divisor) (step 91). Next, a value of N is incremented by 1 (step 92). Next, the divisor is subtracted from a dividend, whereby it is determined whether or not the dividend is greater than the divisor (step 93). In the case where determination is made that the dividend is greater than the divisor, a quotient is shifted to the left by one bit, and 0 is written to the last bit of the quotient (step 94). On the other hand, in the case where the dividend is smaller than the divisor, the quotient is shifted to the left by one bit, and 1 is written to the last bit of the quotient (step 95). In this case, the divisor is subtracted from the dividend, and the obtained result is treated as a new dividend (step 96). After step 94 or 96, the divisor is shifted to the right by one bit (step 97). The above-described process from steps 93 to 97 is repeated N+1 times (steps 98 and 99), whereby a product is calculated.

As shown in FIG. 18, in the case of a division, a process is branched depending on the results of a calculation for subtracting a divisor from a dividend (step 93). Thus, a division processing time becomes longer compared to a case in which a process from steps 81 to 86 is simply repeated like a multiplication as shown in FIG. 17.

As such, the conventional method requires a division since a calculation using a ratio is performed, which may result in a prolonged time spent for calculating a goal time. As a result, there is a possibility that display of the goal time is delayed, whereby quick notification of the player as to the goal time becomes impossible. Also, for example, the conventional method can be applied to a case in which a passing time is measured not only at a final goal line but also at a passing point in the course. However, if display of a passing time is delayed due to prolonged measurement of the passing time, the player may find it difficult to identify the passing point indicated by a currently-displayed passing time.

Also, based on the conventional method, it is possible to calculate a time with excellent precision. However, in many games, it is not necessary to perform a calculation with such precision. For example, in the case where three decimal places of a time are to be displayed, it is not necessary to calculate the numerical value to the fourth decimal place. Depending on the contents of a game and the performance of a game apparatus, for example, displaying a time as quickly as possible may be preferred over calculating a precise time. However, by the conventional method, it is impossible to freely adjust a value used for calculating T1 or T2 in a game program. That is, for example, a game program creator is not allowed to adjust accuracy and/or processing time of a goal time calculation process depending on the contents of a game and the performance of a game apparatus.

Therefore, an aspect of the illustrative embodiments is to provide a traveling time calculation program capable of calculating, as precisely as required, the traveling time of a movable object that travels in a game space.

Also, another aspect of the illustrative embodiments is to provide a traveling time calculation program capable of performing a process required for calculating a traveling time in a short time.

Also, still another aspect of the illustrative embodiments is to provide a traveling time calculation program wherein accuracy and processing time of a process of calculating the traveling time of a movable object can be easily adjusted, depending on the contents of a game and the performance of a game apparatus, for example.

The illustrative embodiments have the following features to attain the aspects mentioned above (notes in parentheses indicate exemplary elements which can be found in the embodiments to follow, though such notes are not intended to limit the scope of the invention).

A first aspect of the illustrative embodiments is directed at a computer readable storage medium (memory card 5 or work memory 32) storing a traveling time calculation program (game program 51) which causes a computer (CPU 31, for example) to execute a process for calculating the traveling time required by a movable object (kart 41) to travel from a first position (start position) to a second position (goal line 42) in a game space by using a unit time (frame time) based on which a game screen is updated. The traveling time calculation program causes the computer to function as: position determination means (CPU 31 executing step 3 (S3): hereinafter, only a step number is shown); virtual position setting means (S12 and S15, S24 and S26, S32 and S35, or S42 and S46); and traveling time calculation means (S11, S17, and S18, S21 and S26, S31, S36, and S38, or S41, S48, and S49). The position determination means determines a position of the movable object using a velocity vector with every update of the game screen. The virtual position setting means sets a virtual position between positions immediately before and after the movable object passes through the second position, and shifts the virtual position using an infinitesimal unit vector (Δv) obtained by dividing a velocity vector (V) at the position immediately before the movable object passes through the second position into predetermined numbers. The traveling time calculation means calculates a traveling time from the first position to a position immediately before or after the virtual position crosses the second position.

Also, in a second aspect, the traveling time calculation means may include estimated time calculation means (S11, S21, or S41). The estimated time calculation means calculates an estimated traveling time of the movable object from the first position to a position through which the movable object passes immediately after passing through the second position by using the unit time. The virtual position setting means may include initial position setting means (S12 or S42) and virtual position update means (S15, S26, and S46). The initial position setting means sets a position, through which the movable object passes immediately after passing through the second position, to an initial virtual position. The virtual position update means repeats a virtual position update process. This process is performed for updating the virtual position to a position that is located on a line segment connecting the position, through which the movable object passes immediately before passing through the second position, and the virtual position and is returned from the virtual position by a predetermined distance (Δv or ΔL) traveled by the movable object during an infinitesimal unit time (Δt) shorter than the unit time. The traveling time calculation means may include determination means (S16, S25 or S47), subtraction means (S17, S26, or S46), and traveling time determination means (S18 or S49). The determination means determines whether or not a virtual position crosses the second position every time the virtual position is determined. The subtraction means subtracts the infinitesimal unit time from the estimated traveling time if the determination means determines that the new virtual position does not cross the second position, thereby calculating a virtual traveling time at the new virtual position. If the determination means determines that the new virtual position crosses the second position, the traveling time determination means determines a virtual traveling time at the new virtual position located immediately before the second position as a traveling time obtained when the movable object passes through the second position. Or the traveling time determination means determines a virtual traveling time at the new virtual position located immediately after the second position as a traveling time obtained when the movable object passes through the second position.

In a third aspect, the traveling time calculation means may include estimated time calculation means (S31). The estimated time calculation means calculates an estimated traveling time of the movable object from the first position to a position through which the movable object passes immediately before passing through the second position, by using the unit time. The virtual position setting means may include initial position setting means (S32) and virtual position update means (S35). The initial position setting means sets a position, through which the movable object passes immediately before passing through the second position, to an initial virtual position. The virtual position update means repeats a virtual position update process performed for updating the virtual position to a position which is located on a line segment connecting the virtual position and the position through which the movable object passes immediately after passing through the second position. The virtual position is advanced from the previous virtual position by a predetermined distance traveled by the movable object during an infinitesimal unit time shorter than the unit time. The traveling time calculation means may include determination means (S37), addition means (S36), and traveling time determination means (S38). Every time the virtual position is determined, the determination means determines whether or not a virtual position crosses the second position. The addition means adds the infinitesimal unit time to the estimated traveling time when the determination means determines that the new virtual position does not cross the second position, thereby calculating a virtual traveling time at the new virtual position. If the determination means determines that the new virtual position crosses the second position, the traveling time determination means determines a virtual traveling time at the new virtual position. The new virtual position is located immediately before the second position or is located immediately after the second position. The traveling time determination means determines the virtual traveling time as a traveling time obtained when the new virtual position crosses the second position.

In a fourth aspect, the traveling time calculation means may include estimated time calculation means (S11, S21, or S41) and subtraction means (S17, S26, or S46). The estimated time calculation means calculates an estimated traveling time of the movable object from the first position to a position through which the movable object passes immediately after passing through the second position, by using the unit time. The subtraction means repeats a subtraction process for subtracting an infinitesimal unit time, shorter than the unit time, from the estimated traveling time. The virtual position setting means calculates a virtual position, indicating a position of the movable object at a virtual traveling time, obtained as a result of the subtraction process for each subtraction process. The traveling time calculation means may include determination means (S16, S25, or S47) and traveling time determination means (S18 or S49). Every time the virtual position is calculated the determination means determines whether or not the calculated virtual position crosses the second position.

Immediately before or after the determination means determines that the virtual position crosses the second position, the traveling time determination means determines a virtual traveling time at a virtual position as a traveling time obtained when the virtual position crosses the second position.

According to a fifth aspect, the traveling time calculation means may include estimated time calculation means (S31) and addition means (S36). The estimated time calculation means calculates an estimated traveling time of the movable object from the first position to a position, through which the movable object passes immediately before passing through the second position, by using the unit time. The addition means repeats an addition process for adding an infinitesimal unit time, shorter than the unit time, to the estimated traveling time. The virtual position setting means calculates, for each addition process, a virtual position indicating a position of the movable object at a virtual traveling time obtained as a result of the addition process. The traveling time calculation means may include determination means (S37) and traveling time determination means (S38). The determination means determines whether or not the calculated virtual position crosses the second position every time the virtual position is calculated. The traveling time determination means determines a virtual traveling time at a virtual position immediately before or after the determination means determines that the virtual position crosses the second position. This traveling time is used as a traveling time obtained when the virtual position crosses the second position.

Note that the traveling time calculation program may further cause the computer to function as detection means (S4) for detecting that the position determined by the position determination means crosses the second position. When the detection means detects that the movable object passes through the second position, the estimated time calculation means calculates an estimated traveling time of the movable object.

Also, the infinitesimal unit time may be obtained by dividing the unit time by a predetermined integer. In this case, the predetermined distance is obtained by dividing a distance, from a position through which the movable object passes immediately before passing through the second position to a position through which the movable object passes immediately after passing through the second position, by the predetermined integer.

Also, the determination means may perform the determination by calculating a distance from a position of the movable object, at which the movable object is located immediately after passing through the second position, to the second position. The determination means may then determine whether or not the calculated distance is longer than a distance from the position of the movable object, at which the movable object is located immediately after passing through the second position, to the virtual position.

Also, the determination means may perform the determination by calculating a distance from a position of the movable object, at which the movable object is located immediately before passing through the second position, to the second position. The determination means may then determine whether or not the calculated distance is longer than a distance from the position of the movable object, at which the movable object is located immediately before passing through the second position, to the virtual position.

Note that the above-described traveling time calculation program may be previously stored in the game apparatus instead of being stored in the computer readable storage medium.

Based on the illustrative embodiments, it is possible to obtain a traveling time at which the movable object passes through the second position, with required accuracy. Also, a traveling time calculation process is performed with required accuracy, whereby it is possible to reduce a calculation time. Further, it is possible to adjust accuracy and a processing time of a traveling time calculation process by adjusting a length of the infinitesimal unit time. Thus, it is possible to appropriately set accuracy and a processing time of a traveling time calculation process depending on the contents of a game and the performance of a game apparatus, for example.

Note that a calculation process by the estimated time calculation means is performed when the detection means detects that the movable object passes through the second position, whereby it is possible to easily calculate a traveling time using the second position as a virtual position.

Also, the infinitesimal unit time is obtained by dividing the unit time by a predetermined integer, whereby it is possible to easily calculate the infinitesimal unit time and a predetermined distance.

Also, the determination means performs the determination using a distance from a position of the movable object, at which the movable object is located immediately before passing through the second position, to the second position, whereby it is possible to easily perform the determination.

These and other objects, features, aspects and advantages of the illustrative embodiments will become more apparent from the following detailed description of the illustrative embodiments when taken in conjunction with the accompanying drawings.

BRIEF DESCRIPTION OF THE DRAWINGS

FIG. 2 is a functional block diagram of a game apparatus;

FIG. 15 is an illustration for describing a goal time calculation process in a fifth variant;

DETAILED DESCRIPTION OF THE ILLUSTRATIVE EMBODIMENTS

Figure 1:
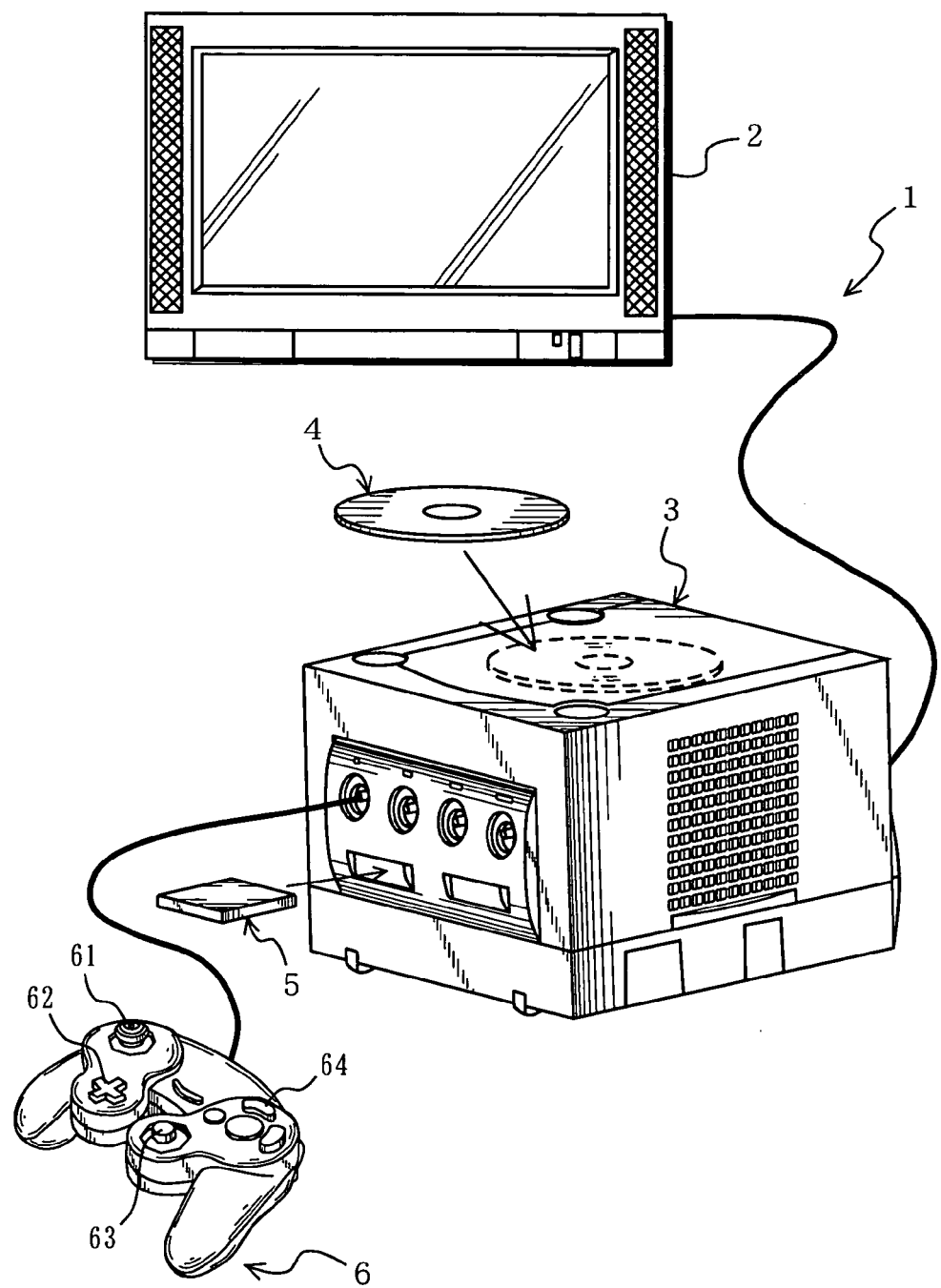
FIG. 1 is an external view of a game system.

Hereinafter, a game program including a traveling time calculation program according to one aspect of the illustrative embodiments and a game system executing the game program will be described. FIG. 1 is an external view of a game system 1. Note that, in the following descriptions, a stationary game apparatus will be taken as one example of a game system executing the game program according to the illustrative embodiments, but it is not limited thereto. For example, the illustrative embodiments can be applied to an apparatus in which a computer executing a game program is installed, such as a portable game apparatus, an arcade game apparatus, a portable terminal, a mobile phone, a personal computer, or any other similar device.

In FIG. 1, the game system 1 includes a stationary game apparatus 3 (hereinafter, referred to as a game apparatus) and a television receiver 2 (hereinafter, referred to as a television) which is one example of a display device connected to the game apparatus 3 via a connection cable. A controller 6 having a plurality of operation switches operable by a player is connected to the game apparatus 3. Also, an optical disk 4, which is one example of an information storage medium storing the game program according to the illustrative embodiments, is removably mounted on the game apparatus 3. Further, a memory card 5 having a flash memory, etc., storing save data of a game, for example, is removably inserted into the game apparatus 3, if needed. The game apparatus 3 displays a game image, which is obtained as a result of execution of the game program stored in the optical disk 4, on the television 2. Further, the game apparatus 3 is able to use the save data stored in the memory card 5, thereby allowing the player to start off where he/she left off in the game at some previous time, or displaying a game image on the television 2 by re-creating a game scene of the game played by the player at some previous time. As a result, the player of the game apparatus 3 can enjoy the game by operating the controller 6 while watching the game image displayed on the television 2.

As described above, the controller 6 is removably connected to the game apparatus 3 via the connection cord. The controller 6 is mainly used for operating a player character (typically, a racing car operated by the player) appearing in a game space displayed on the television 2, and is provided with input sections such as operation buttons, keys, and sticks, etc., as a plurality of operation switches. Specifically, the controller 6 has a grip section held by the player. Also, the controller 6 includes, for example, a main stick 61 and a cross key 62, which are operable by a player's left thumb, and a C stick 63 and an A button 64, which are operable by a player's right thumb. Note that, other than the above-described buttons, the controller 6 includes a B button, an X button, a Y button, a start-pause button, a R button operable by a player's right index finger, etc., and an L button operable by a player's left index finger, etc. For example, in the case where a racing game, which will be described below, is played by operating the controller 6, the main stick 61 is used for instructing a handle operation of the racing car operated by the player. Also, the A button 64 is used for instructing an acceleration operation of the racing car. Other operation switches may be used during the progress of the game, which will be described below. However, those switches are not directly related to the description of the illustrative embodiments, and therefore the detailed description thereof is hereinafter omitted. Also, the game system 1 allows a plurality of players to play the game at the same time by connecting a plurality of controllers 6 to the game apparatus 3.

Next, with reference to FIG. 2, a structure of the game apparatus 3 will be described. FIG. 2 is a functional block diagram of the game apparatus 3. In FIG. 2, the game apparatus 3 includes a 128-bit CPU 31 (Central Processing Unit), for example, for executing various programs. The CPU 31 executes a boot-up program stored in a boot ROM (not shown), and performs initialization, etc., of a memory such as a work memory 32, etc. Then, after reading a game program stored in the optical disk 4 to the work memory 32, the CPU 31 executes the game program, thereby performing a game process according to the game program. The work memory 32, a video RAM (VRAM) 33, an external memory interface (I/F) 34, a controller interface (I/F) 35, a GPU (Graphics Processing Unit) 36, and an optical disk drive 37 are connected to the CPU 31 via a bus.

The work memory 32, which is a storage area used by the CPU 31, appropriately stores a game program, etc., necessary for a process performed by the CPU 31. For example, the work memory 32 stores a game program and various data, etc., read from the optical disk 4 by the CPU 31 (see FIGS. 5A and 5B). The game program and various data, etc., stored in the work memory 32 are executed by the CPU 31. The VRAM 33 stores game image data for displaying a game image on the television 2. The external memory I/F 34 communicably connects the game apparatus 3 and the memory card 5 by inserting the memory card 5 into a connector (not shown). The CPU 31 accesses a backup memory provided in the memory card 5 via the external memory I/F 34. The controller I/F 35 communicably connects an external device and the game apparatus 3 by a connector (not shown). For example, the controller 6 is connected to the above connector via a connection cord, whereby the controller 6 is connected to the game apparatus 3 via the controller I/F 35. The GPU 36 is composed of semiconductor chips performing, for example, a vector calculation and a rendering process, etc., necessary for display of 3D graphics in response to an instruction from the CPU 31, and a game image rendered by the GPU 36 is displayed on the television 2. The optical disk drive 37 reads various data such as a game program, image data, and sound data, etc., stored in the optical disk 4 in response to an instruction from the CPU 31.

Figure 3A:
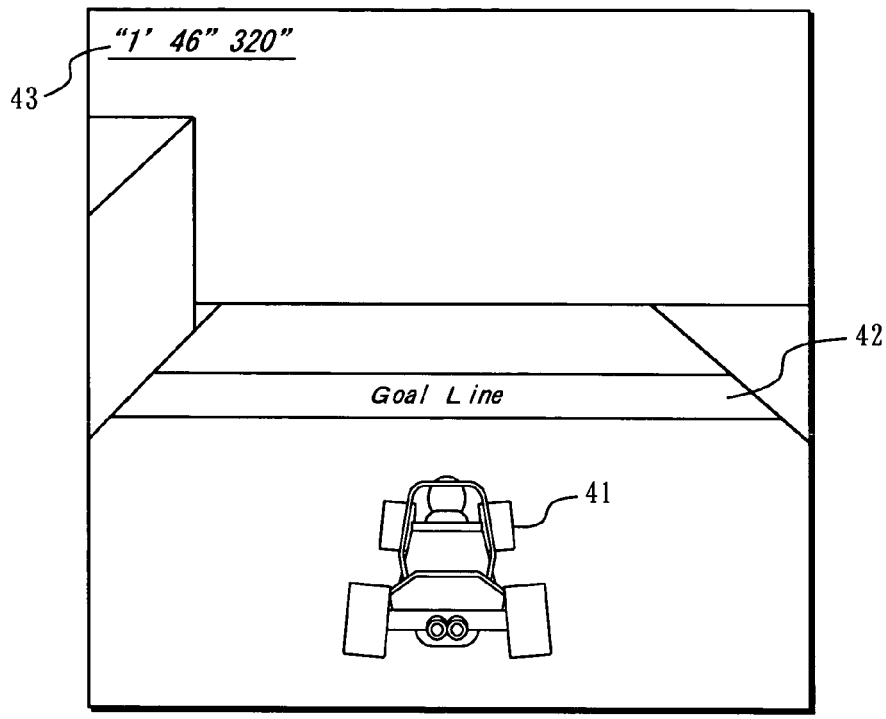
FIGS. 3A and 3B are illustrations showing an exemplary game screen of a racing game executed in the game apparatus by a game program.
Figure 3B:
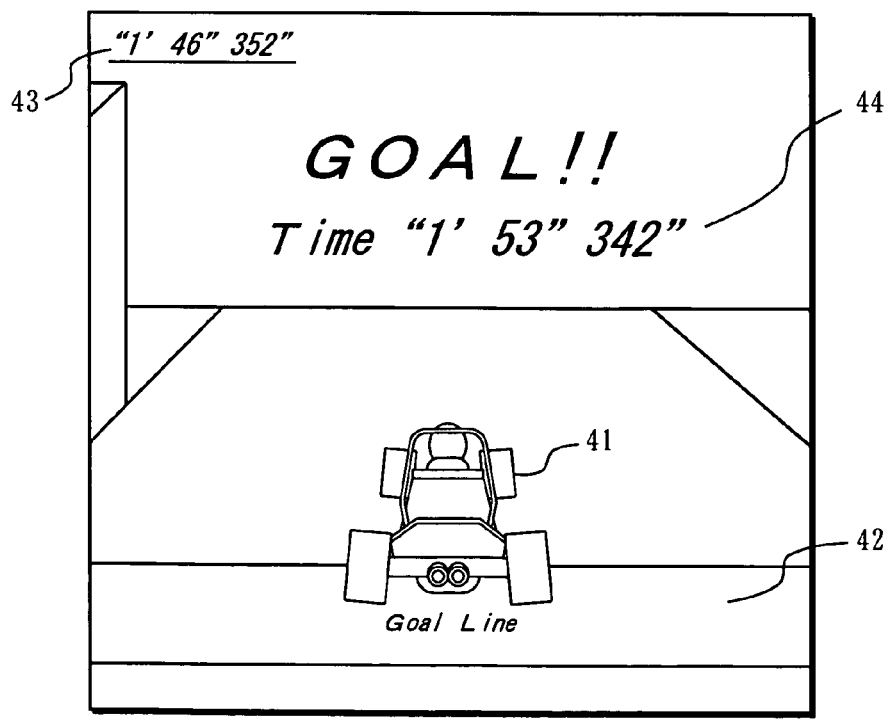

Hereinafter, a game displayed on the television 2 when the game program according to the present aspect, which is stored in the optical disk 4, is executed by the game apparatus 3 will be described. FIGS. 3A and 3B are illustrations showing an exemplary game screen of a racing game executed by the game apparatus 3. As shown in FIGS. 3A and 3B, the above game is a racing game in which a racing car (kart) 41 operated by the player is traveling along a course in a three-dimensional game space. In this racing game, the player enjoys playing the game by going for the best traveling time (goal time) the kart 41 takes to cross a goal line 42 after starting from a start point (not shown in FIGS. 3A and 3B).

Note that, in the present aspect, a racing game is taken as an example for description. However, a traveling time calculation program according to the present invention is not limited thereto. The traveling time calculation program according to the illustrative embodiments may be a game performing a process for calculating the traveling time a movable object, which travels in a virtual space, takes to travel between two arbitrary points, using a unit time smaller than a unit time by which a screen is updated. For example, the traveling time calculation program according to the illustrative embodiments may be an action game, etc. Also, the game space may be a three-dimensional space or a two-dimensional space. Also, a movable object whose traveling time is to be calculated is not limited to an object operated by the player. For example, a movable object whose traveling time is to be calculated may be an object whose operation is controlled by the game apparatus, such as a racing car appearing in the racing game other than the racing car operated by the player.

When the game is started, the kart 41 operated by the player starts from a start point. The player plays the game by operating the kart 41 so that it crosses the goal line 42 as fast as possible. Here, a game screen is updated for each predetermined unit time (frame time) and displayed. In this game, assume that a frame time is 1/60 (sec). A position of the kart 41 is calculated for each frame time based on an operation by the player, whereby the kart 41 is displayed so that its position in the game space is updated for each frame time. As a result, the game apparatus 3 is able to display images in which the kart 41 is traveling. FIG. 3A shows one example of such a game screen. In FIG. 3A, the kart 41 whose position is calculated for each frame time is displayed on the course in the game space. Also, the goal line 42 is displayed on the course.

Also, on the upper left corner of the game screen as shown in FIG. 3A, an elapsed time display 43 indicating a time elapsed from a start time is displayed. This elapsed time represents a time elapsed from when the kart 41 starts the start point to the current time. The elapsed time is calculated using a frame time as a unit. In FIG. 3A, the elapsed time is displayed in 1/1000 (sec). Thus, every time the game screen is updated, a value indicated by the elapsed time display 43 is incremented by 16 (msec) ($\cong$ 1/60 (sec)) and displayed. That is, the elapsed time is calculated using a frame time as a unit, whereby it is impossible to display the elapsed time to an accuracy of less than 1/60 (sec).

FIG. 3B is an illustration showing the game screen immediately after the kart 41 crosses the goal line 42. In FIG. 3B, a value indicated by the elapsed time display 43 is increased by 32 (msec), meaning that FIG. 3B is a game screen two frames after the game screen as shown in FIG. 3A. In FIG. 3B, the kart 41 crosses the goal line 42, and a message saying "GOAL!!" is displayed on the game screen so as to notify the player that he/she reached the goal. Further, a goal time display 44 indicating a goal time at which the kart crosses the goal line 42 is displayed on the game screen. The goal time indicated by the goal time display 44 is calculated to an accuracy of less than a frame time unit, that is, 16 (msec).

Figure 4:
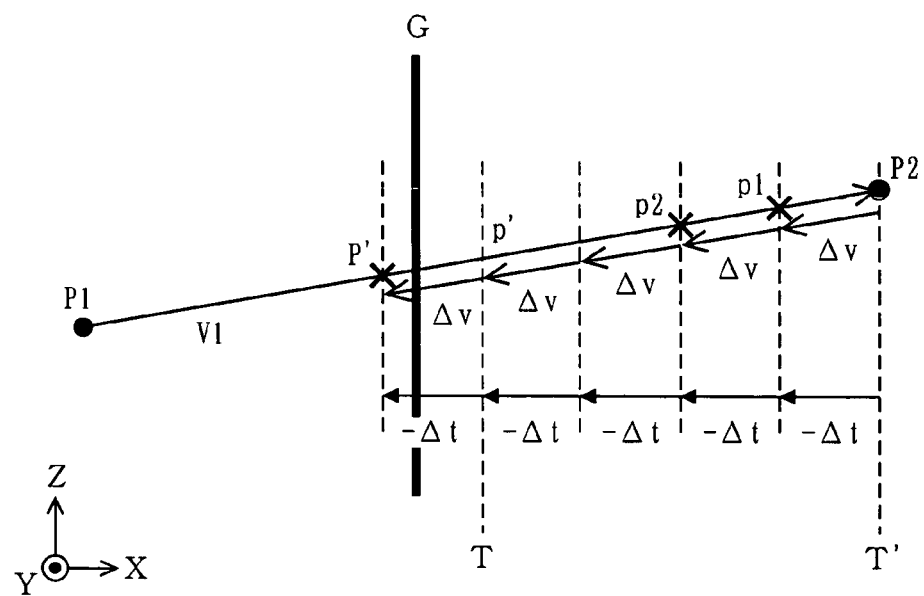
FIG. 4 is an illustration for describing a traveling time calculation process in the present embodiment.

Next, an outline of the traveling time calculation process performed in the game program according to the present aspect will be described. FIG. 4 is an illustration for describing the traveling time calculation process in the present aspect. In FIG. 4, the kart 41 is located at a position P1 in the game space. Assume that the position P1 is represented as (x1, y1, z1) using three-dimensional coordinates. Here, in the present game program, a position of the kart 41 in a frame following each frame is determined by a velocity vector. Note that the velocity vector, which is a well-known technique in the game program, is calculated based on an operation by the player, such as a tilt of the stick, an amount of depression of the operation button, or a time during which the operation button is depressed. Here, the velocity vector in the game program is a unit indicating a traveling direction and an amount of traveling, and is used for calculating a certain coordinate point in the game space. The velocity vector is a unit indicating a traveling direction and a traveling amount of a movable object in one frame. Specifically, in FIG. 4, in the case where the kart 41 is located at the position P1, a velocity vector V1 is first determined based on an operation by the player. Next, a position P2 of the kart 41 in a next frame is determined based on the velocity vector V1. Specifically, assume that the position P2 is (x2, y2, z2), and the velocity vector V1 is (vx1, vy1, vz1), the position P2 is determined by an equation (3):

$$(x2,y2,z2)=(x1,y1,z1)+(vx1,vy1,vz1) \qquad (3)$$

The above-described velocity vector calculation process and the process for calculating a position in a next frame are performed every time the game screen is updated. As a result, a position of the kart 41 is updated for each frame time, whereby the kart 41 travels.

In the present aspect, the traveling time calculation process is performed when a position of the kart 41 exceeds a goal line G. Note that, in the case where the position of the kart 41 falls on the goal line G, it is preferable to determine that the kart 41 exceeds the goal line G. On the other hand, it may be determined that the kart 41 does not exceed the goal line G. In FIG. 4, the position P1 is a position through which the kart 41 passes immediately before the kart 41 crosses the goal line G, and the position P2 is a position through which the kart 41 passes immediately after the kart 41 crosses the goal line G. Thus, when the position of the kart 41 is changed from the position P1 to the position P2, the traveling time calculation process is performed. In the traveling time calculation process, an infinitesimal unit time $\Delta t$ and an infinitesimal unit vector $\Delta t$ are first calculated. The infinitesimal unit time $\Delta t$ is shorter than a frame time. A traveling time is calculated to an accuracy of this infinitesimal unit time $\Delta t$. In the present aspect, the infinitesimal unit time $\Delta t$ is a value obtained by dividing a frame time by a predetermined integer n. That is, assume that a frame time is Tf, the infinitesimal unit time $\Delta t$ is calculated as follows:

$$\Delta t = Tf/n \qquad (4)$$

On the other hand, the magnitude of the infinitesimal unit vector $\Delta v$ corresponds to a distance that the kart 41 travels per infinitesimal unit time $\Delta t$. Also, a direction of the infinitesimal unit vector $\Delta v$ is a direction opposite to the velocity vector V1. That is, the infinitesimal unit vector $\Delta v$ is a traveling direction opposite to a velocity vector, and indicates a traveling amount smaller than the velocity vector. The infinitesimal unit vector $\Delta v$ is calculated as follows:

$$\Delta v = -V1/n \qquad (5)$$

Note that, in the present aspect, the predetermined integer n is previously determined in the game program. The greater the predetermined integer n becomes, the smaller the infinitesimal unit time $\Delta t$ becomes, whereby it is possible to measure the goal time with higher accuracy. That is, the predetermined integer n is a value indicating the accuracy with which a goal time is measured. Thus, hereinafter, the predetermined integer n is referred to as a measurement accuracy value.

After the infinitesimal unit time $\Delta t$ and the infinitesimal unit vector $\Delta v$ are calculated, a virtual position is set on a line segment connecting the position P1 and the position P2. At the virtual position, a traveling time is calculated with high accuracy. In the present aspect, the virtual position at the start of the traveling time calculation process is set to the position P2. Then, the virtual position is shifted from the position P2 by the above-described infinitesimal unit vector $\Delta v$. That is, the virtual position is updated so that a position shifted from the original virtual position by the infinitesimal unit vector $\Delta v$ is set as a new virtual position.

Also, every time the virtual position is set, a traveling time at this virtual position is calculated. Note that "a traveling time at the virtual position" corresponds to a traveling time from the start point to the virtual position. Specifically, the traveling time at the virtual position is calculated as follows: First, a traveling time T' at a first virtual position (position P2) can be calculated using a frame time. A next virtual position p1 is set to a position shifted from the position P2 by the infinitesimal unit vector Δv. A traveling time at the position p1 is a value obtained by subtracting the infinitesimal unit time Δt from the traveling time T'. Further, a next virtual position p2 is set to a position shifted from the previous virtual position p1 in a direction of the position P1 by the infinitesimal unit vector Δv (in other words, "returned position"). A traveling time at the position p2 is a value obtained by subtracting the infinitesimal unit time Δt from the traveling time at the virtual position p1. With regard to the following virtual positions, each virtual position is set to a position shifted from the previous virtual position by the infinitesimal unit vector Δv in a similar manner. Thus, a traveling time at the following virtual position can be sequentially calculated by subtracting the infinitesimal unit time Δt from the traveling time at the previous virtual position.

The above-described process for calculating a virtual position and a traveling time at the virtual position is performed until the virtual position exceeds the goal line G, that is, the virtual position coincides with a position P' just before the goal line G. Note that "a position just before the goal line" represents a position through which the kart passes before the kart crosses the goal line. On the other hand, "a position beyond the goal line" represents a position through which the kart passes after the kart crosses the goal line. Also, in the case where the virtual position falls on the goal line G, it is preferable to determine that the goal line G is exceeded. On the other hand, it may be determined that the goal line G is not exceeded. In the case where the virtual position is set to the position P' just beyond the goal line G, a traveling time at a previous virtual position p' (a position immediately before the goal line G) is determined as a goal time T. Note that the traveling time at the position p' is calculated when a virtual position is set to the position p'. In FIG. 4, the goal time T is a value obtained by subtracting the infinitesimal unit time Δt from the traveling time at the position P2 four times. That is, T=T'−4×Δt. Note that, in the present aspect, a traveling time at the position p' immediately before the goal line G is determined as a goal time T on the assumption that "a goal time T is a traveling time at a position through which the kart passes after the kart crosses the goal line". However, in other aspects, a traveling time at the position P' just beyond the goal line G may be determined as a goal time T.

Figure 5A:
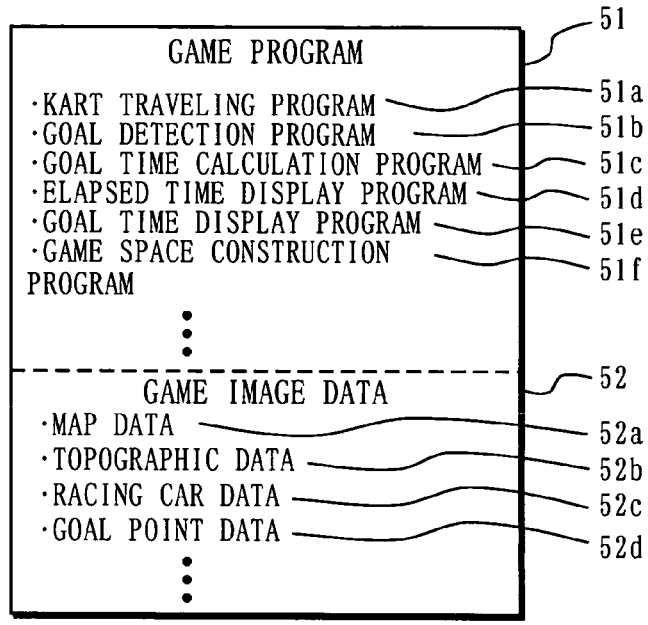
FIGS. 5A and 5B are illustrations showing data stored in an optical disk and a memory map of a work memory of the game apparatus.
Figure 5B:
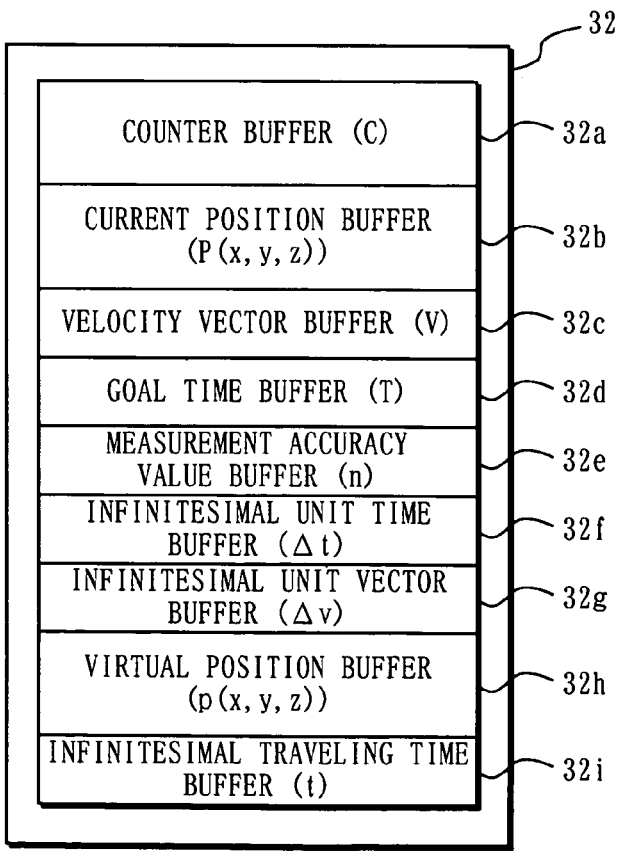
Figure 6:
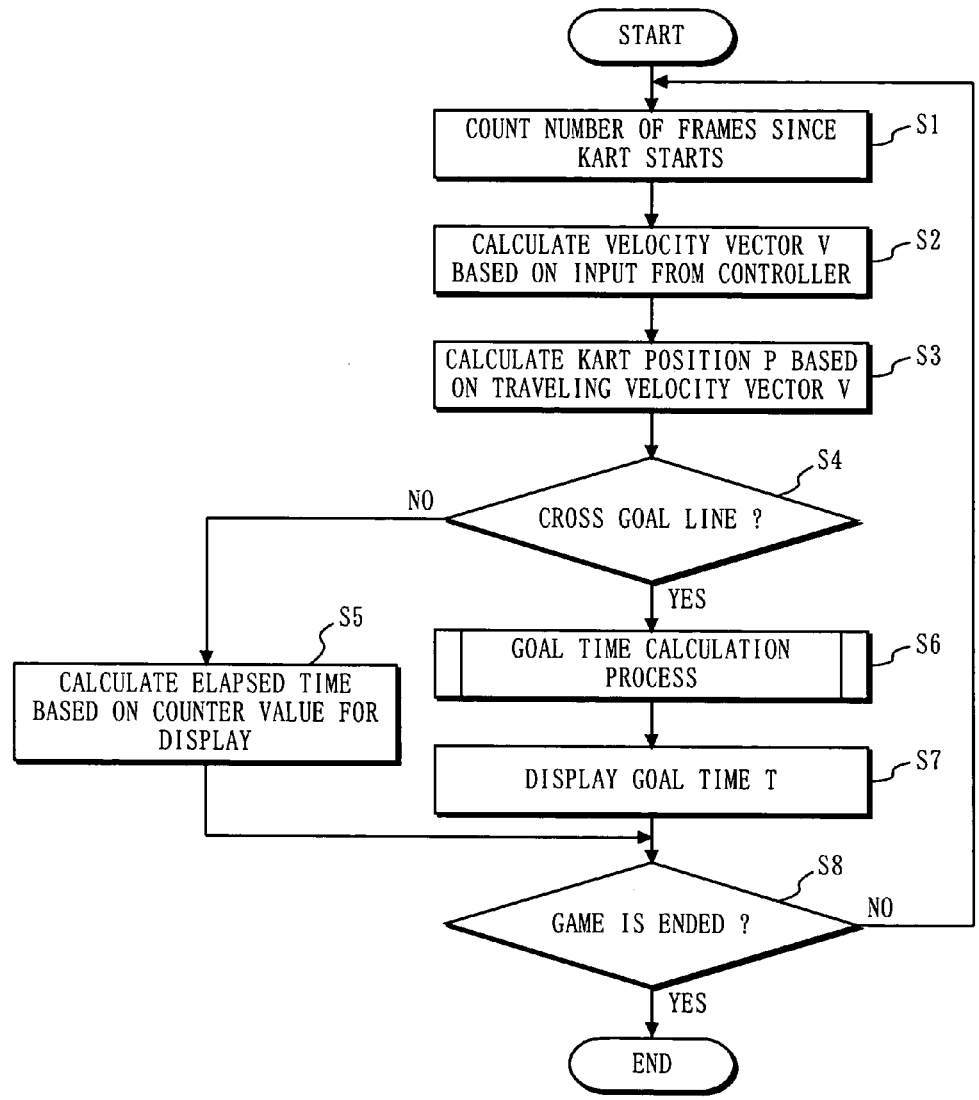
FIG. 6 is a main flowchart of a game process executed in the game apparatus.

Next, with reference to FIGS. 5A and 5B and FIGS. 6 to 8, a game process executed by the game apparatus 3 will be described. When power is applied to the game apparatus 3, the CPU 31 of the game apparatus 3 executes a boot-up program stored in a boot ROM (not shown), whereby each unit such as the work memory 32, etc., is initialized. Then, the game program stored in the optical disk 4 is read to the work memory 32 via the optical disk drive 37, and execution of the game program is started. As a result, a game space is displayed on the television 2 via the GPU 36, whereby the game is started. A flowchart in FIG. 6 shows a process after the above-described process operation. Note that, hereinafter, a process regarding calculation and display of a traveling time will be mainly described, and a description of a kart traveling process and a process for displaying a game map (racecourse) and a kart on the game screen, which are not directly related to the illustrative embodiments, will be omitted.

Before the details of the game process are described, data stored in the work memory 32 for use in the game process will be described. FIGS. 5A and 5B are illustrations showing data stored in the optical disk 4 and a memory map of the work memory 32 of the game apparatus 3. FIG. 5A is an illustration showing a memory map of a game program 51 and game image data 52 stored in the optical disk 4. In FIG. 5A, the game program 51 includes, for example, a kart traveling program 51*a*, a goal detection program 51*b*, a goal time calculation program 51*c*, an elapsed time display program 51*d*, a goal time display program 51*e*, and a game space construction program 51*f*.

The kart traveling program 51*a* determines a position of the kart every time the game screen is updated. The goal detection program 51*b* detects that the kart position determined by the kart traveling program 51*a* crosses the goal line. The goal time calculation program 51*c* performs a goal time calculation process, which will be described below. The elapsed time display program 51*d* displays an elapsed time (the elapsed time display 43 as shown in FIG. 3A) measured in frame time on the game screen. The goal time display program 51*e* displays a goal time (the goal time display 44 as shown in FIG. 3B) measured to an accuracy of less than a frame time unit on the game screen in which the kart crosses the goal line. The game space construction program 51*f* constructs a racecourse in the game space. Note that, other than the above-described programs, the game program 51 includes various programs such as a program for performing a scoring process.

Also, in FIG. 5A, the game image data 52 used for generating a game image includes, for example, map data 52*a*, topographic data 52*b*, racing car data 52*c*, and goal point data 52*d*. The map data 52*a* is image data of a racecourse generated in the game space. The topographic data 52*b* is image data of the topographic features around the racecourse. The racing car data 52*c* is image data of a kart operated by the player and other karts appearing in the game. The goal point data 52*d* is image data of a goal line on the racecourse. Note that, other than the above-described data, the game image data 52 includes, for example, various image data such as image data of an item.

Also, FIG. 5B is an illustration showing a memory map of the work memory 32 of the game apparatus 3. The work memory 32 includes a counter buffer 32*a*, a current position buffer 32*b*, a velocity vector buffer 32*c*, a goal time buffer 32*d*, a measurement accuracy value buffer 32*e*, an infinitesimal unit time buffer 32*f*, an infinitesimal unit vector buffer 32*g*, a virtual position buffer 32*h*, and an infinitesimal traveling time buffer 32*i*.

The counter buffer 32*a* is an area for storing a counter value C. The counter value C indicates the number of frames counted from when the kart starts to travel from the start point. The counter value C is used for calculating an elapsed time from a start time in an arbitrary frame. The current position buffer 32*b* is an area for storing a current kart position P. The kart position P is represented as three-dimensional coordinates (x, y, z). The velocity vector buffer 32*c* is an area for storing a kart velocity vector V. As is the case with the position P, the velocity vector V is represented as three-dimensional coordinates (x, y, z).

The goal time buffer 32*d* stores a goal time T. When the kart crosses the goal line, the goal time T stored in the goal time buffer 32*d* is displayed on the screen (see FIG. 3B). In a process for calculating the goal time T (step 6 of FIG. 6, which will be described below), the measurement accuracy value buffer 32*e*, the infinitesimal unit time buffer 32*f*, the infinitesimal unit vector buffer 32g, the virtual position buffer 32h, and the infinitesimal traveling time buffer 32i, which will be described below, are used.

The measurement accuracy value buffer 32e stores a measurement accuracy value n (n is the above-mentioned predetermined integer). In the present aspect, assume that a value n is previously determined in the game program. The infinitesimal unit time buffer 32f is an area for storing the infinitesimal unit time Δt. The infinitesimal unit vector buffer 32g is an area for storing the infinitesimal unit vector Δv. The virtual position buffer 32h stores a virtual position p. The virtual position p is represented as three-dimensional coordinates (x, y, z). The infinitesimal traveling time buffer 32i is an area for storing a traveling time t at the virtual position p.

Hereinafter, the game process will be described in detail. FIG. 6 is a main flowchart of the game process executed in the game apparatus 3. Note that FIG. 6 shows a process performed after the game is begun and the kart starts from the start point. Also, a series of processes performed at steps 1 to 8 as shown in FIG. 6 (in the drawings, "step" is abbreviated as "S") are performed during one frame.

First, at step 1, the number of frames is counted from when the kart is started. Specifically, the CPU 31 increments a value of the counter buffer 32a by 1. At the following step 2, a velocity vector V is calculated based on an operation by the player, that is, an input from the controller 6. At the same time, the contents of the velocity vector buffer 32c of the work memory 32 are updated to the newly calculated velocity vector. Further, at step 3, a kart position P is calculated based on the velocity vector V. Specifically, a kart position P is newly calculated by the equation (3) based on the velocity vector V, which is updated at step 2 and is stored in the velocity vector buffer 32c, and the position P currently stored in the current position buffer 32b. Note that the contents of the current position buffer 32b are updated to the newly calculated position P. By this step 3, a kart position is determined every time the game screen is updated. Note that the process at steps 2 and 3 is performed by using the kart traveling program 51a included in the game program 51.

At the following step 4, it is determined whether or not the kart passes the goal line, that is, the position P calculated at step 3 is a position beyond the goal line. Note that, in the present aspect, it is assumed that the goal line is represented as a plane in the three-dimensional game space, and that the three-dimensional game space is divided into two portions by the plane of the goal line. Thus, at step 4, the CPU 31 calculates a distance between the position P (x, y, z) calculated at step 3 and the plane ax+by+cz+d=0 (a, b, and c are constants) representing the goal line. Then, depending on the calculation results (positive or negative), it is determined whether the position P lies in a space just before the goal line or lies in a space beyond the goal line. As a result, it is possible to determine whether or not the kart passes the goal line. Note that the process at step 4 is performed using the goal detection program 51b.

If determination is made at step 4 that the kart does not pass the goal line, a process at step 5 is performed. That is, a time elapsed from a start time to the current time (the elapsed time display 43 as shown in FIG. 3A) is displayed on the game screen. The elapsed time is calculated using the counter value C. Specifically, the elapsed time is calculated as a product of the counter value C and the frame time Tf (sec). Note that the process at step 5 is performed using the elapsed time display program 51d. After step 5, a process at step 8 is performed.

On the other hand, if it is detected at step 4 that the kart passes the goal line, that is, if it is determined at step 4 that the kart passes the goal line, processes at steps 6 and 7 are performed. That is, at step 6, a goal time calculation process is performed. The goal time calculation process is performed for calculating a goal time to an accuracy of less than a frame time. By step 6, a value of the goal time T is written to the goal time buffer 32d of the work memory 32. Note that the process at step 6 is performed using the goal time calculation program 51c. The details of step 6 will be described in FIG. 7, which will be described below. At the following step 7, the goal time calculated at step 6 is displayed on the game screen. As a result, it is possible to notify the goal time to the player to an accuracy of less than a frame time. Note that the process at step 7 is performed using the goal time display program 51e. After step 7, a process at step 8 is performed.

At the following step 8, it is determined whether or not the game is ended. For example, it is determined whether or not a predetermined time is passed from when the goal time of the kart is displayed, or an operation for ending the game is performed by the player. If determination is made at step 8 that the game is not ended, a series of processes performed from steps 1 to 8 are re-performed. On the other hand, if determination is made at step 8 that the game is ended, the game process as shown in FIG. 6 is ended.

Figure 7:
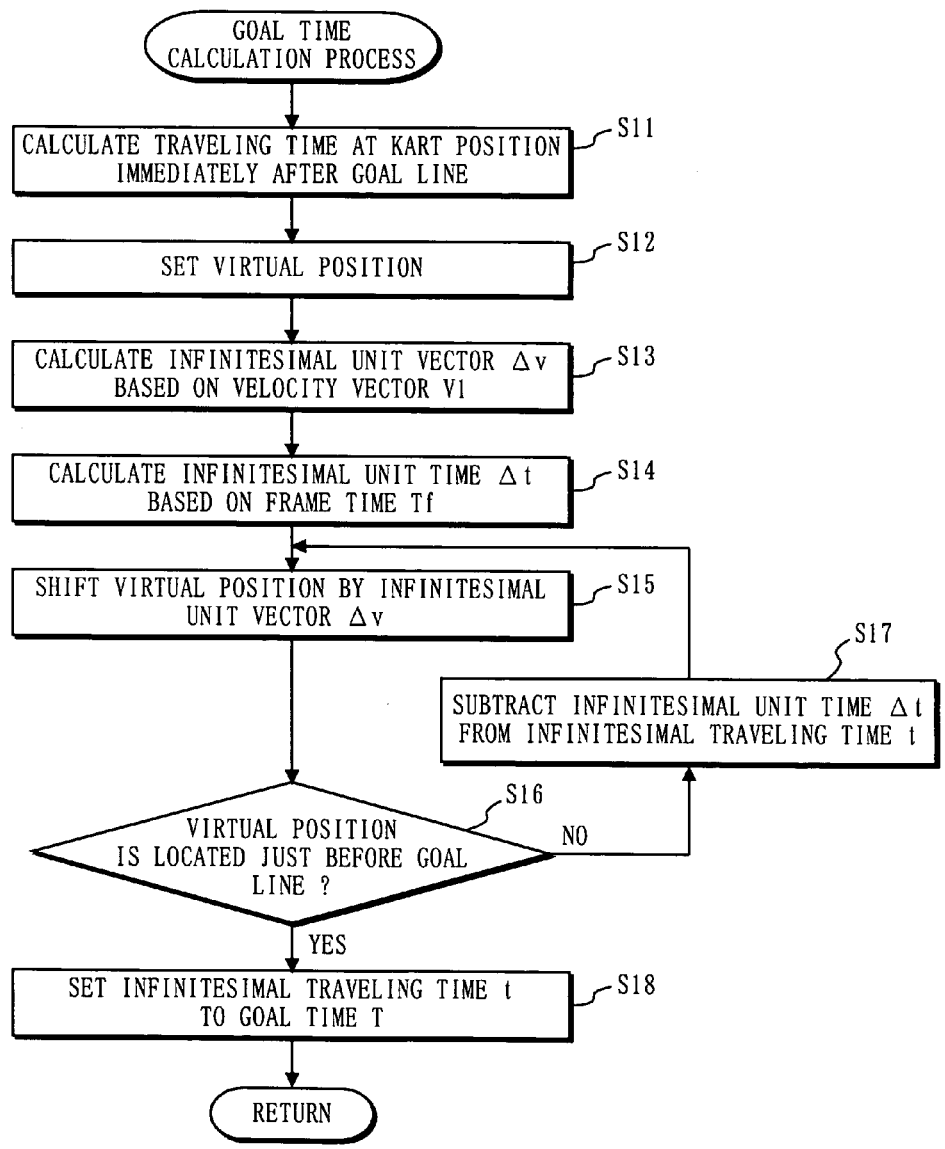
FIG. 7 is a flowchart showing a detailed process flow of step 6 as shown in FIG. 6.

FIG. 7 is a flowchart showing a detailed process flow of step 6 as shown in FIG. 6. First, at step 11, a traveling time at a position P2 through which the kart passes immediately after the kart crosses the goal line is calculated. Note that the position P2 through which the kart passes immediately after the kart crosses the goal line is a position calculated at the immediately preceding step 3. The traveling time at the position P2 can be calculated as a product of the counter value C stored in the counter buffer 32a and the frame time Tf (sec). Note that the traveling time calculated at step 11 is calculated to an accuracy of a frame time, whereby the above traveling time may be referred to as an estimated traveling time. The estimated traveling time calculated at step 11 is stored in the infinitesimal traveling time buffer 32i of the work memory 32. At the following step 12, the position P2 is set to a virtual position. Specifically, the coordinates of the position P2 are stored in the virtual position buffer 32h of the work memory 32.

At the following step 13, an infinitesimal unit vector Δv is calculated. The infinitesimal unit vector Δv is calculated by multiplying a velocity vector V1 by −1/n (n is the above-described measurement accuracy value). Note that the velocity vector V1 is a velocity vector currently stored in the velocity vector 32c of the work memory 32. The infinitesimal unit vector Δv calculated at step 11 is stored in the infinitesimal unit vector buffer 32g of the work memory 32.

At the following step 14, an infinitesimal unit time Δt is calculated. The infinitesimal unit time Δt is calculated by multiplying the frame time Tf by 1/n. The infinitesimal unit time Δt calculated at step 13 is stored in the infinitesimal unit time buffer 32f of the work memory 32.

At the following step 15, a virtual position update process is performed for shifting a virtual position p by the infinitesimal unit vector Δv. That is, a position shifted from the current virtual position by the infinitesimal unit vector Δv is set to a new virtual position. Specifically, the contents of the virtual position p stored in the virtual position buffer 32h of the work memory 32 is updated to position coordinates obtained by adding the infinitesimal unit vector Δv to the currently stored position coordinates.

At the following step 16, it is determined whether or not the current virtual position lies in a position just before the goal line. Determination at step 16 is performed by using the position coordinates currently stored in the virtual position buffer 32h of the work memory 32. It is possible to perform determination at step 16 in a manner similar to step 4 as shown in FIG. 6.

If determination is made at step 16 that the current virtual position does not lie just before the goal line, a process at step 17 is performed. That is, at step 17, the infinitesimal unit time Δt is subtracted from the infinitesimal traveling time t stored in the infinitesimal traveling time buffer 32i of the work memory 32. As a result, a traveling time at the current virtual position (the virtual position calculated at the immediately preceding step 16) is calculated. Here, in the present specification, a traveling time at the virtual position may be referred to as a virtual traveling time. Note that the estimated traveling time calculated at step 11 is included in the virtual traveling time. After step 17, a process at step 15 is re-performed, and the processes at steps 15 and 17 are repeated until it is determined YES at step 16.

On the other hand, if it is determined at step 16 that the current virtual position lies just before the goal line, a process at step 18 is performed. That is, at step 18, the current infinitesimal traveling time t is determined as a goal time T. Specifically, the contents of the infinitesimal traveling time t stored in the infinitesimal traveling time buffer 32i of the work memory 32 are stored in the goal time buffer 32d. Note that the virtual position stored in the virtual position buffer 32h at step 18 lies just before the goal line. On the other hand, the contents of the infinitesimal traveling time t stored in the infinitesimal traveling time buffer 32i do not indicate a traveling time at a position just before the goal line. The contents of the infinitesimal traveling time t stored in the infinitesimal traveling time buffer 32i at step 18 indicate a traveling time at a virtual position (a position beyond the goal line) previous to the position just before the goal line. Thus, according to the present aspect, a traveling time at a virtual position immediately before the virtual position just before the goal line is determined as a goal time. After the above-described step 17, the process as shown in FIG. 7 is ended.

Figure 8:
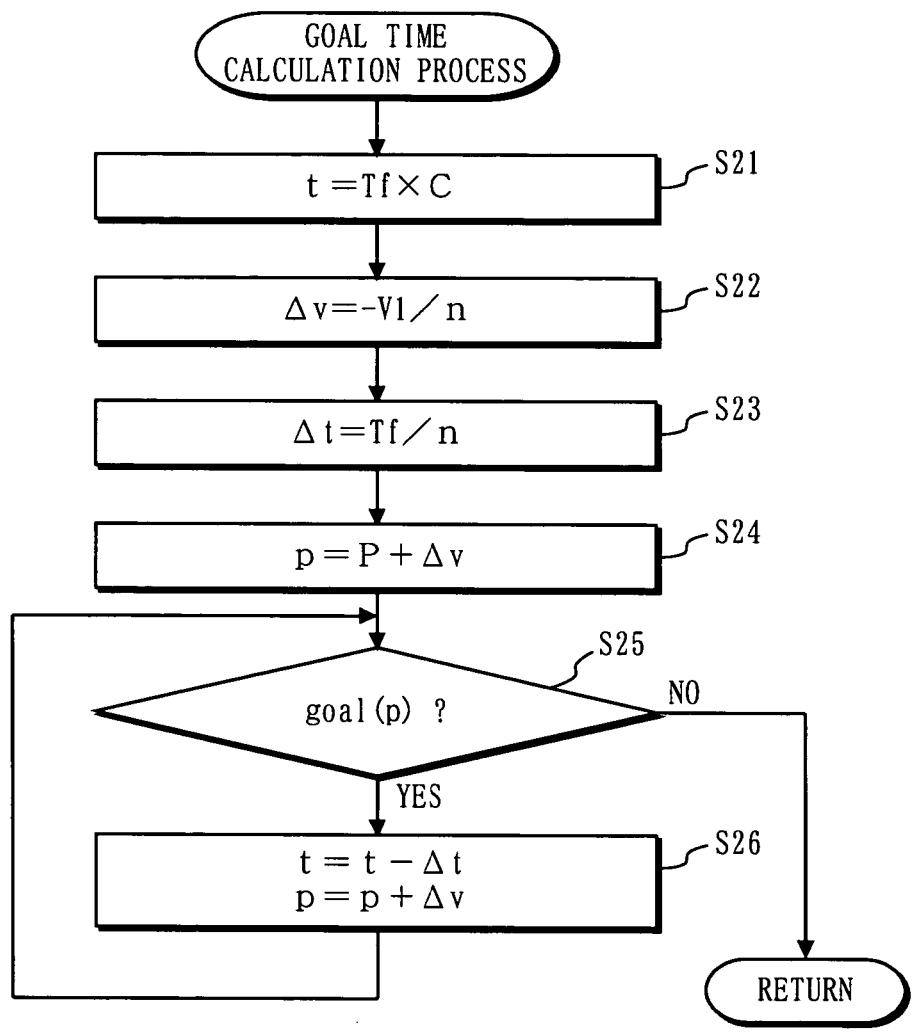
FIG. 8 is a flowchart showing a goal time calculation process as shown in FIG. 7 as close to an actual program process as possible.

FIG. 8 is a flowchart showing the goal time calculation process as shown in FIG. 7 as close to an actual program process as possible. Note that the flowchart as shown in FIG. 8 differs from FIG. 7 in some parts, but the same process as FIG. 7 is performed thereby. First, at step 21, a calculation t=Tf×C is performed. The infinitesimal traveling time t calculated at step 21 is an estimate traveling time at a kart position immediately after the kart crosses the goal line. That is, step 21 corresponds to the process at step 11.

At the following step 22, a calculation Δv=−V1/n is performed. This step 22 corresponds to the process at step 13. At the following step 23, a calculation Δt=Tf/n is performed. This step 23 corresponds to the process at step 14.

At the following step 24, a calculation p=P+Δv is performed. Here, P represents an actual position of the kart, that is, the position coordinates stored in the current position buffer 32b. Specifically, the position P represents a position of the kart (position P2 as shown in FIG. 4) immediately after the kart crosses the goal line. Thus, the virtual position p calculated at step 24 is a virtual position (position p1 as shown in FIG. 4) shifted from the kart position immediately after the kart crosses the goal line by the infinitesimal unit vector Δv. At the following step 25, a calculation goal (p) is performed. Here, goal (p) is a function for determining whether or not the position p is beyond the goal line. If the function goal (p) returns YES, calculations t=t−Δt and p=p+Δv are performed at step 26. The calculation t=t−Δt corresponds to step 17, and the calculation p=p+Δv corresponds to the virtual position update process at step 15. After step 26, a process at step 25 is re-performed. On the other hand, if the function goal (p) returns NO, the process as shown in FIG. 8 is ended. A value of the infinitesimal traveling time t at the time of end of the process as shown in FIG. 8 is determined as a goal time T. Thus, in the process as shown in FIG. 8, a buffer may be provided into which the infinitesimal traveling timebuffer 32i and the goal timebuffer 32d of the work memory 32 are combined, thereby displaying a value of this buffer at the end time of the process, as shown in FIG. 8, as a goal time. As such, in the process as shown in FIG. 8, it is possible to combine the infinitesimal traveling time buffer 32i and the goal time buffer 32d, thereby reducing a memory area of the work memory 32.

As described above, in the present aspect, a process for shifting a virtual position p by an infinitesimal unit vector Δv is repeated, and every time the above process is performed, a process for subtracting the infinitesimal unit time Δt from the traveling time (infinitesimal traveling time t) at a pre-shifted virtual position is performed (steps 15 and 16, step 26). As a result, it is possible to calculate a goal time T by only using addition, subtraction, and multiplication, without performing division. Thus, it is possible to reduce processing time for calculating a goal time T compared to a process performing division.

Also, in the present aspect, it is possible to calculate a goal time with greater accuracy by changing the magnitude of the measurement accuracy value n; alternatively it is possible to calculate a goal time more quickly. That is, as the magnitude of the measurement accuracy value n is increased, the accuracy of a goal time to be calculated is improved. Or, as the magnitude of the measurement accuracy value n is reduced, a goal time is calculated more quickly. Therefore, it is possible to calculate an appropriate goal time, whether increased calculation speed or accuracy is desired, for each of various games by changing a value n in accordance with a game apparatus and the game contents for which the goal time is calculated. For example, where it is desired to calculate/display a goal time with a certain accuracy, a value n satisfying such accuracy may be set. That is, if it is desired to calculate a goal time in 1/1000 (sec) where a frame time is 1/60 (sec), it is possible to realize an approximately intended accuracy in 1/1000 (sec) by setting n to 17. On the other hand, if it is desired to perform a goal time calculation process more quickly, a value of n may be reduced.

Note that, in the process as shown in FIGS. 7 and 8, a process for shifting a virtual position (step 15) is followed by a process for calculating a traveling time at the post-shifted virtual position (step 17). In other aspects, a process for calculating a traveling time at a post-shifted virtual position may be followed by a process for shifting a virtual position. That is, a subtraction process for subtracting an infinitesimal unit time from a traveling time at the current virtual position may be repeated, and a virtual position indicating a position of a movable object at a traveling time for which a subtraction process is performed may be calculated for each subtraction process.

Also, in the process as shown in FIGS. 7 and 8, a process for shifting a virtual position (step 15) and a process for calculating a traveling time at a post-shifted virtual position (step 17) are alternately performed, but a method by which these two processes are not alternately performed may also be used. For example, there may be a method by which a process for shifting a virtual position is performed two times and a process for calculating a traveling time at the post-shifted virtual position is subsequently performed one time. Such a method, however, is substantially the same as doubling the magnitude of an infinitesimal unit time Δt (i.e., halving the measurement accuracy value n).

Also, in the process as shown in FIGS. 7 and 8, it is assumed that a goal time is a virtual traveling time at a virtual position through which the kart passes immediately before the kart crosses the goal line (position p' as shown in FIG. 4). Note that, in the case where a virtual traveling time at a virtual position through which the kart passes immediately after the kart crosses the goal line (position P' as shown in FIG. 4) is set to a goal time, the process as shown in FIGS. 7 and 8 may be changed as follows. That is, in FIG. 7, step 15 is followed by step 17, and step 16 is subsequently executed. If determination at step 16 is NO, a process is goes back to step 15. Also, in FIG. 8, a kart position through which the kart passes immediately after the kart crosses the goal line may be set to a virtual position at step 24. That is, a calculation p=P may be performed at step 24.

Also, in the process at step 17 as shown in FIG. 7, in place of subtracting an infinitesimal unit time Δt from an infinitesimal traveling time t, a new counter C' (which is different from the counter value C) may be prepared, thereby performing a process for incrementing a value of the counter C' (which is initially set to 0) by 1. Note that, in this method, a goal time T is calculated at step 18 as follows: T=T'−Δt×C'. By the above method using the counter C', it is possible to obtain the same effect as FIG. 7. Such a method, however, is substantially the same as a method for subtracting an infinitesimal unit time Δt from an infinitesimal traveling time t. Also, the method as shown in FIG. 7 is favorable compared to the method using the additional counter C' since the former is not required to additionally prepare the counter C'.

Note that the above-described aspect has variants which will be described below. In the variants described below, it is possible to obtain the same effect as in the present aspect. Hereinafter, the variants of the present aspect will be described.

Figure 9:
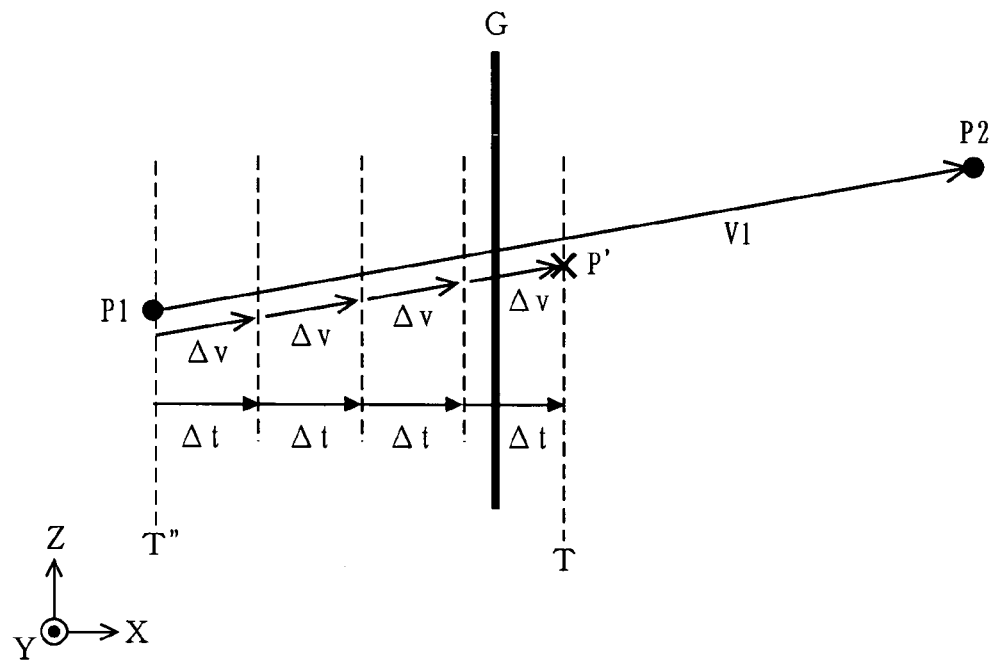
FIG. 9 is an illustration for describing a goal time calculation process in a first variant.

FIG. 9 is an illustration for describing a goal time calculation process in a first variant of the present aspect. The first variant differs from the above-described aspect in that a position P1 through which the kart passes immediately before the kart crosses the goal line is set to a first virtual position. Also, an infinitesimal unit vector Δv is calculated so as to have the same direction of a velocity vector V1. Specifically, the infinitesimal unit vector Δv is calculated as follows: Δv=V1/n. Also, as shown in FIG. 9, an infinitesimal traveling time t is calculated by adding the infinitesimal unit time Δt to a traveling time T" at the position P1. That is, in the first variant, a virtual position is shifted from the position P1 through which the kart passes immediately before the kart crosses the goal line, and every time the virtual position is shifted, a traveling time at the virtual position is calculated. Then, a traveling time at a virtual position through which the kart passes immediately after the kart crosses the goal line is determined as a goal time.

Figure 10:
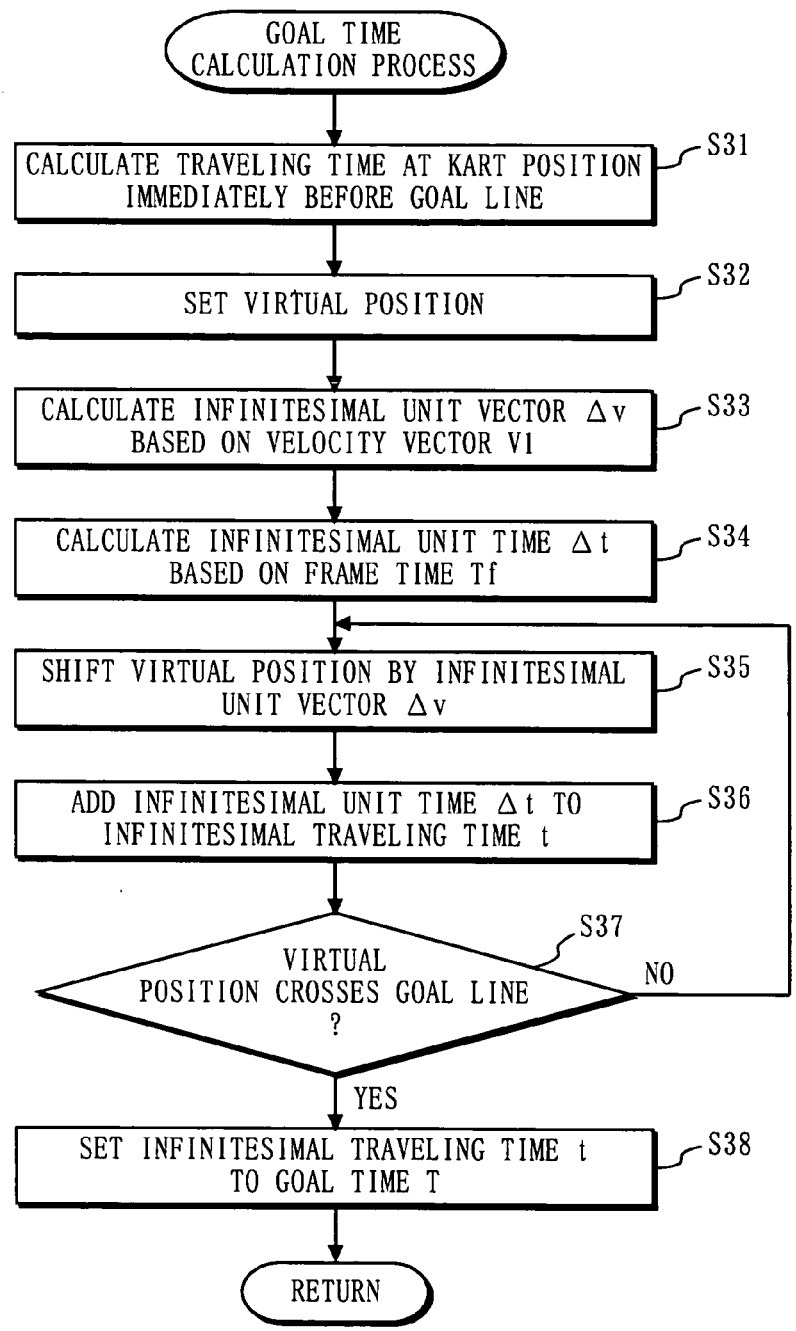
FIG. 10 is a flowchart showing a flow of a traveling time calculation process in the first variant.

FIG. 10 is a flowchart showing a flow of a traveling time calculation process in the first variant. Also in the first variant, the same main flowchart as shown in FIG. 6 is used. Hereinafter, descriptions of a process as shown in FIG. 10 will be mainly focused on a difference between FIGS. 7 and 10.

First, at step 31, a traveling time at the position P1 through which the kart passes immediately before the kart crosses the goal line is calculated. Note that, at a point of step 31, the contents of the current position buffer 32b of the work memory 32 indicate a position P2 through which the kart passes immediately after the kart crosses the goal line. Thus, in the first variant, it is necessary to prepare a buffer for storing a position of the kart in the previous frame, in addition to a buffer for storing a current position of the kart (current position buffer 32b). Note that a calculation method is the same as step 11 as shown in FIG. 7. At the following step 32, a virtual position is set. In the first variant, a first virtual position is set to the position P1.

At the following step 33, an infinitesimal unit vector Δv is calculated. The first variant differs from step 13 in that the infinitesimal unit vector Δv is calculated as follows: Δv=V1/n. A process at the following step 34 is the same as step 14, and a process at step 35 differs from step 15 only in that a direction indicated by the infinitesimal unit vector Δv is different.

In the first variant, at step 36, a process corresponding to step 17 is performed. Note that step 36 differs from the above-described aspect in that the infinitesimal unit time Δt is added to the current infinitesimal traveling time t. The process at step 36 is performed after step 35 since, in the first variant, a traveling time at a virtual position which is determined to cross the goal line is determined as a goal time.

At the following step 37, it is determined whether or not the current virtual position is beyond the goal line. This determination can be performed in a manner similar to step 4 and step 15. A process at step 38 is the same as step 18.

By the above-described first variant, it is possible to obtain the same effect as the above-described aspect. However, the above-described aspect is favorable since the first variant requires a buffer for storing a kart position in the previous frame.

Figure 11:
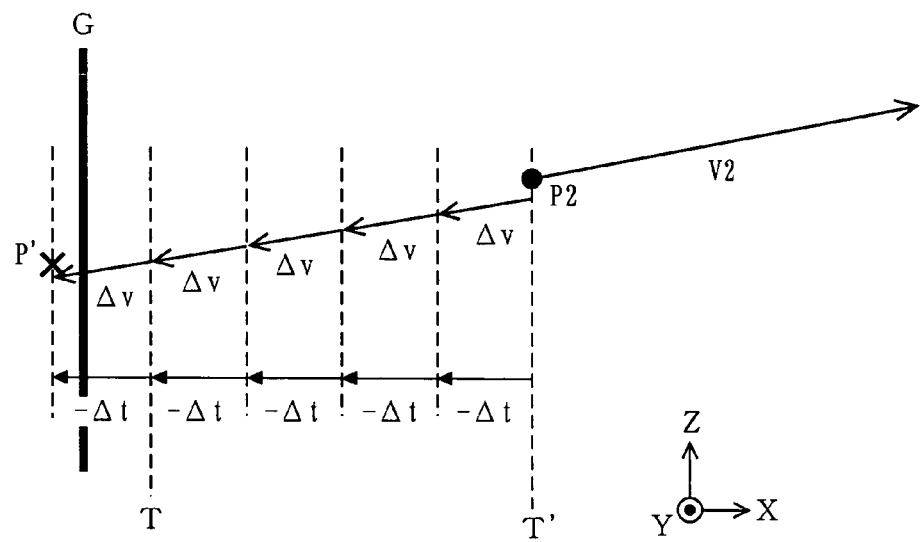
FIG. 11 is an illustration for describing a goal time calculation process in a second variant.

Next, a second variant of the present aspect will be described. FIG. 11 is an illustration for describing a goal time calculation process in the second variant of the present aspect. In the second variant, an infinitesimal unit vector Δv used in the goal time calculation process is calculated based on a velocity vector V2. The velocity vector V2 is used for determining a kart position in a next frame based on a position P2 through which the kart passes immediately after the kart crosses the goal line. Specifically, the infinitesimal unit vector Δv is calculated as follows: Δv=−V2/n. The second variant differs from the above-described aspect only in that the infinitesimal unit vector Δv is calculated based on the velocity vector V2.

By the above-described second variant, it is possible to obtain the same effect as the present aspect. However, in the second variant, the velocity vector V2 is used, whereby a goal time in a frame next to a frame in which the kart crossed the goal line is calculated. Thus, the above-described aspect is favorable when compared to the second variant since calculation of a goal time is delayed by one frame in the latter.

Figure 12:
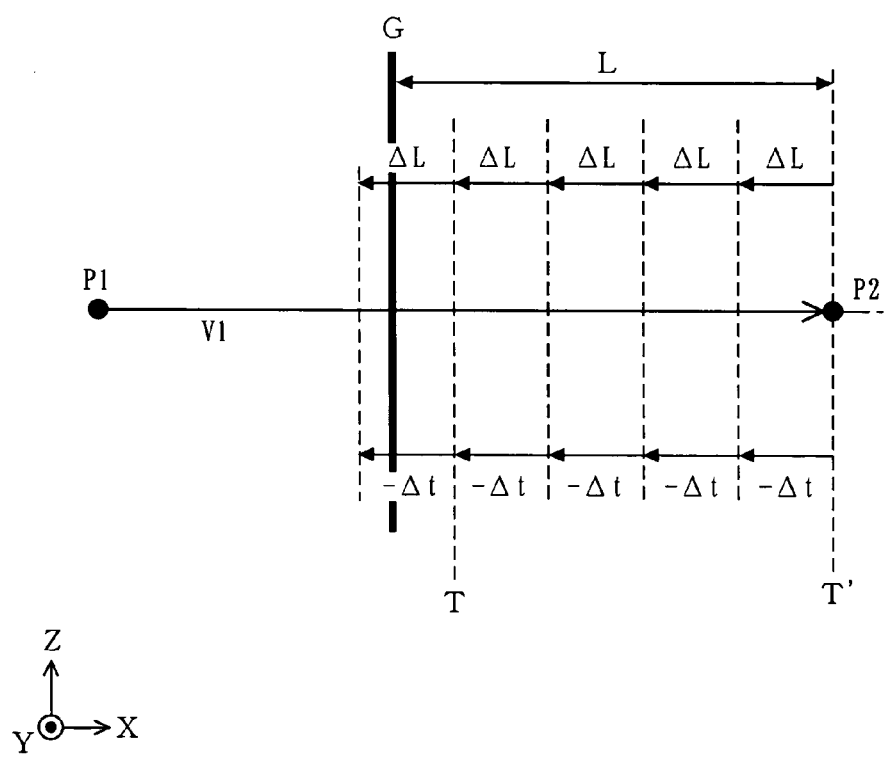
FIG. 12 is an illustration for describing a goal time calculation process in a third variant.

Next, a third variant of the present aspect will be described. FIG. 12 is an illustration for describing a goal time calculation process in the third variant of the present aspect. The third variant differs from the above-described aspect in a method for determining whether or not a virtual position reaches a position just before the goal line. That is, in the third variant, a virtual position is represented not by coordinate values in the game space, but by a distance L from the goal line. Note that the distance L is measured on a line segment connecting the position P1 and the position P2. In order to shift the virtual position, a process for subtracting an infinitesimal distance ΔL from the distance L is performed. Here, the infinitesimal distance ΔL is a distance through which the kart travels in the infinitesimal unit time Δt. That is, the infinitesimal distance ΔL is a scalar value indicating the magnitude of the infinitesimal unit vector Δv. Determination as to whether or not the virtual position reaches a position just before the goal line is performed by determining whether or not the distance L, from which the infinitesimal distance ΔL is subtracted every time the virtual position is shifted, becomes negative. Hereinafter, the goal time calculation process in the third variant will be described in detail.

Figure 13:
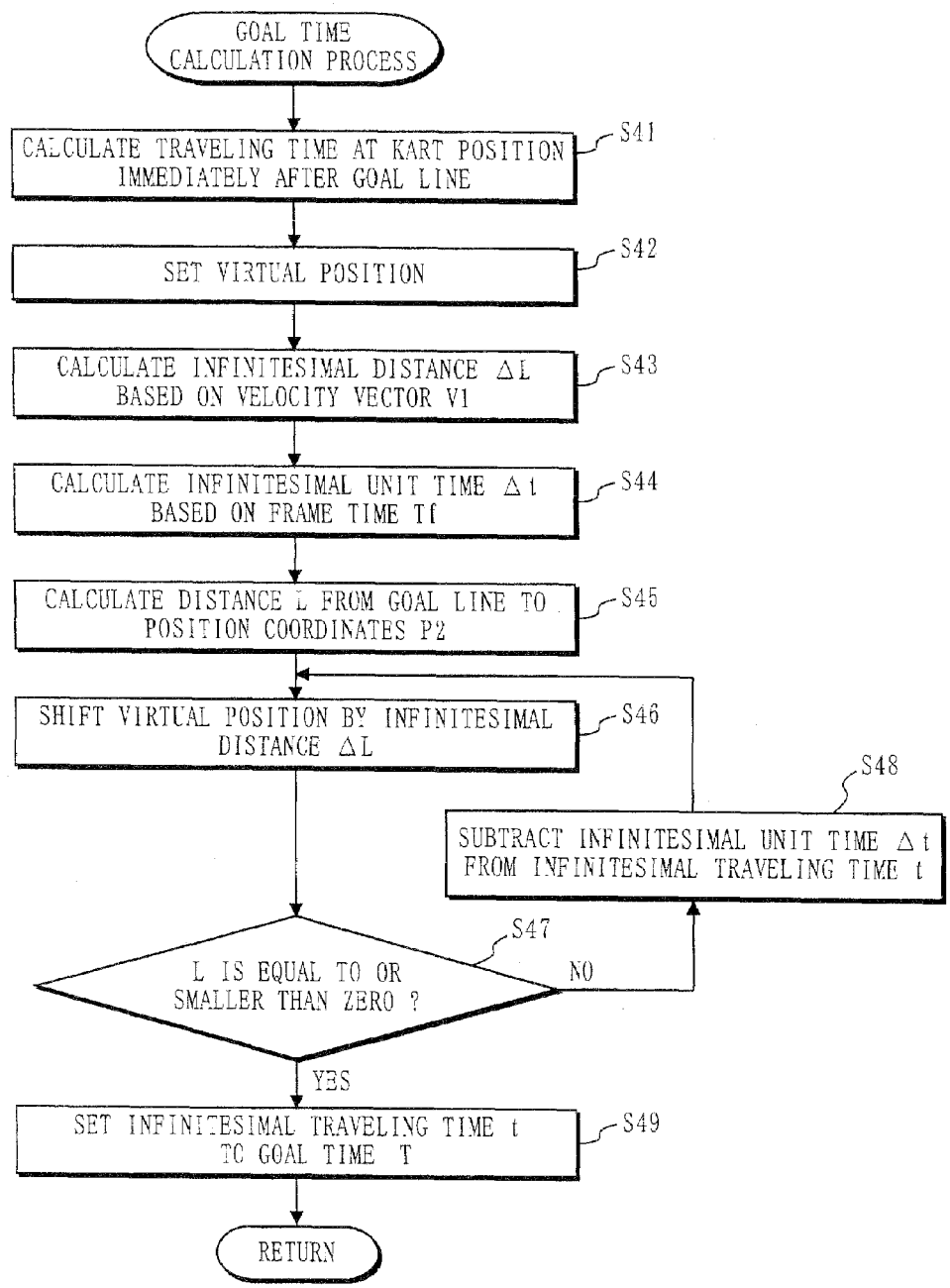
FIG. 13 is a flowchart showing a flow of a traveling time calculation process in the third variant.

FIG. 13 is a flowchart showing a flow of a traveling time calculation process in the third variant. Also in the third variant, the same main flowchart as shown in FIG. 6 is used. Note that, in the third variant, an area for storing the above-described distance L and an area for storing the infinitesimal distance ΔL have to be provided in the work memory 32, instead of the infinitesimal unit vector buffer 32g and the virtual position buffer 32h as shown in FIG. 5B. Hereinafter, descriptions of a process as shown in FIG. 13 will be mainly focused on a difference between FIGS. 7 and 13.

First, a process at step 41 is the same as step 11. Also, a process at step 42 is the same as step 12. At the following step 43, the infinitesimal distance ΔL is calculated using the velocity vector V1. Specifically, the infinitesimal distance ΔL is calculated by multiplying the magnitude of the velocity vector V1 by 1/n. A process at the following step 44 is the same as step 14.

At the following step 45, a distance L from the goal line to the position P2 is calculated. This distance L indicates a distance from the goal line to the virtual position. That is, at step 45, a first virtual position is set to the position P2. At the following step 46, the virtual position is shifted by the infinitesimal distance ΔL. Specifically, a value obtained by subtracting the infinitesimal distance ΔL from the current distance L is newly set to a distance L. At the following step 47, determination as to whether or not the virtual position reaches a position just before the goal line is performed by determining whether or not L is equal to or smaller than zero. A process performed at step 48, if determination is made at step 47 that L is not equal to or smaller than zero, is the same as step 17. Also, a process performed at step 49, if determination is made at step 47 that L is equal to or smaller than zero, is the same as step 18.

By the above-described third variant, it is possible to obtain the same effect as the above-described aspect. Also, in the third variant, a virtual position is represented not by three-dimensional coordinates, but by a distance L from the goal line. Thus, it is possible to simplify the process for shifting a virtual position (step 46).

Figure 14:
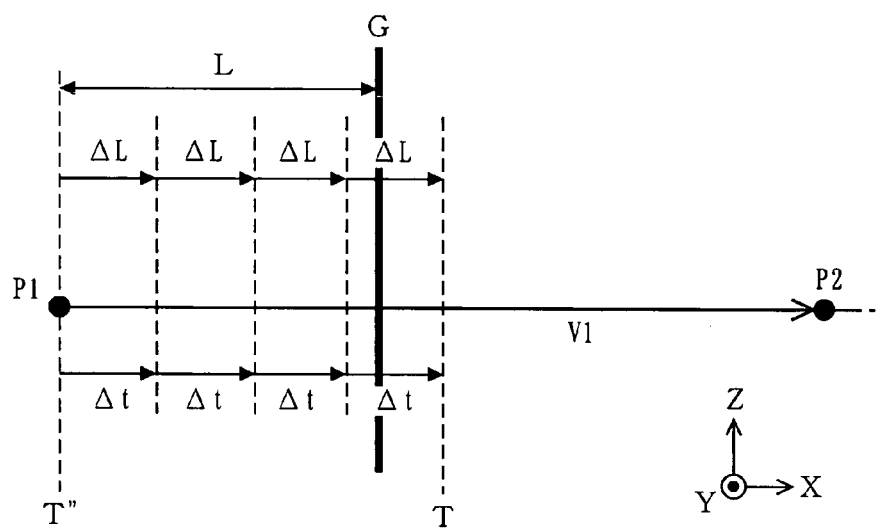
FIG. 14 is an illustration for describing a goal time calculation process in a fourth variant.
Figure 16:
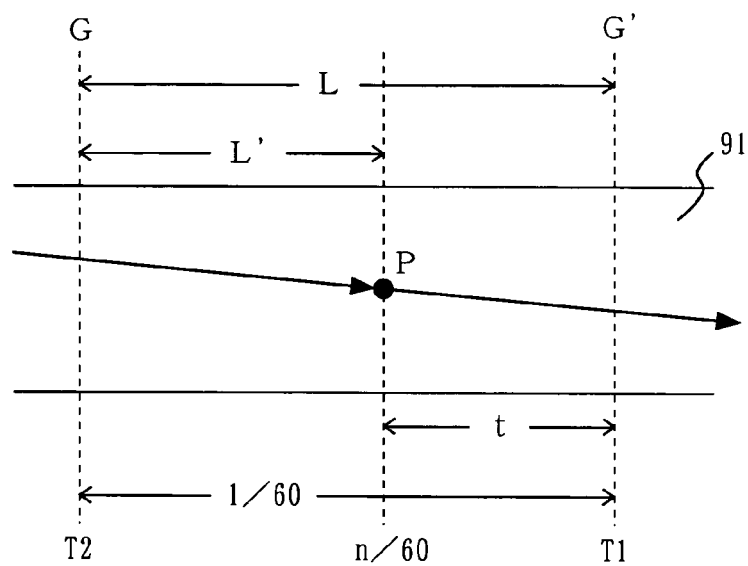
FIG. 16 is an illustration for describing a conventional method for measuring a goal time.
Figure 17:
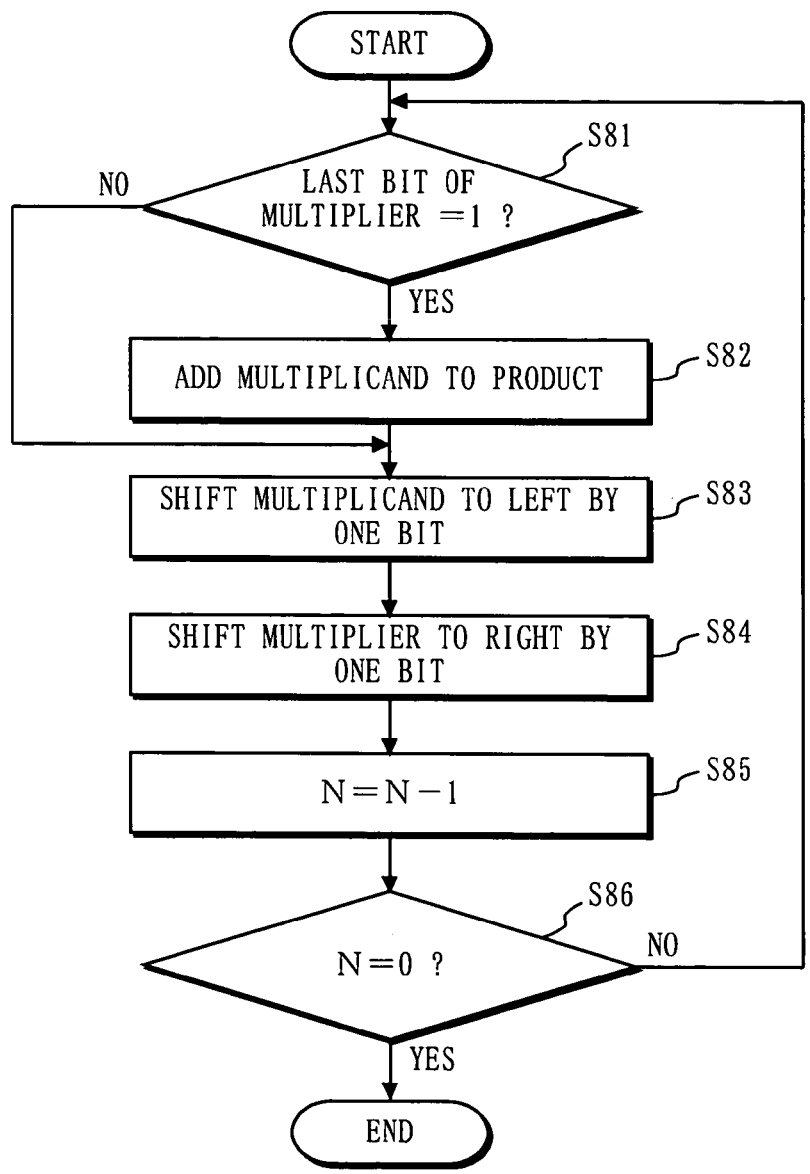
FIG. 17 is a flowchart showing a flow of a multiplication process.
Figure 18:
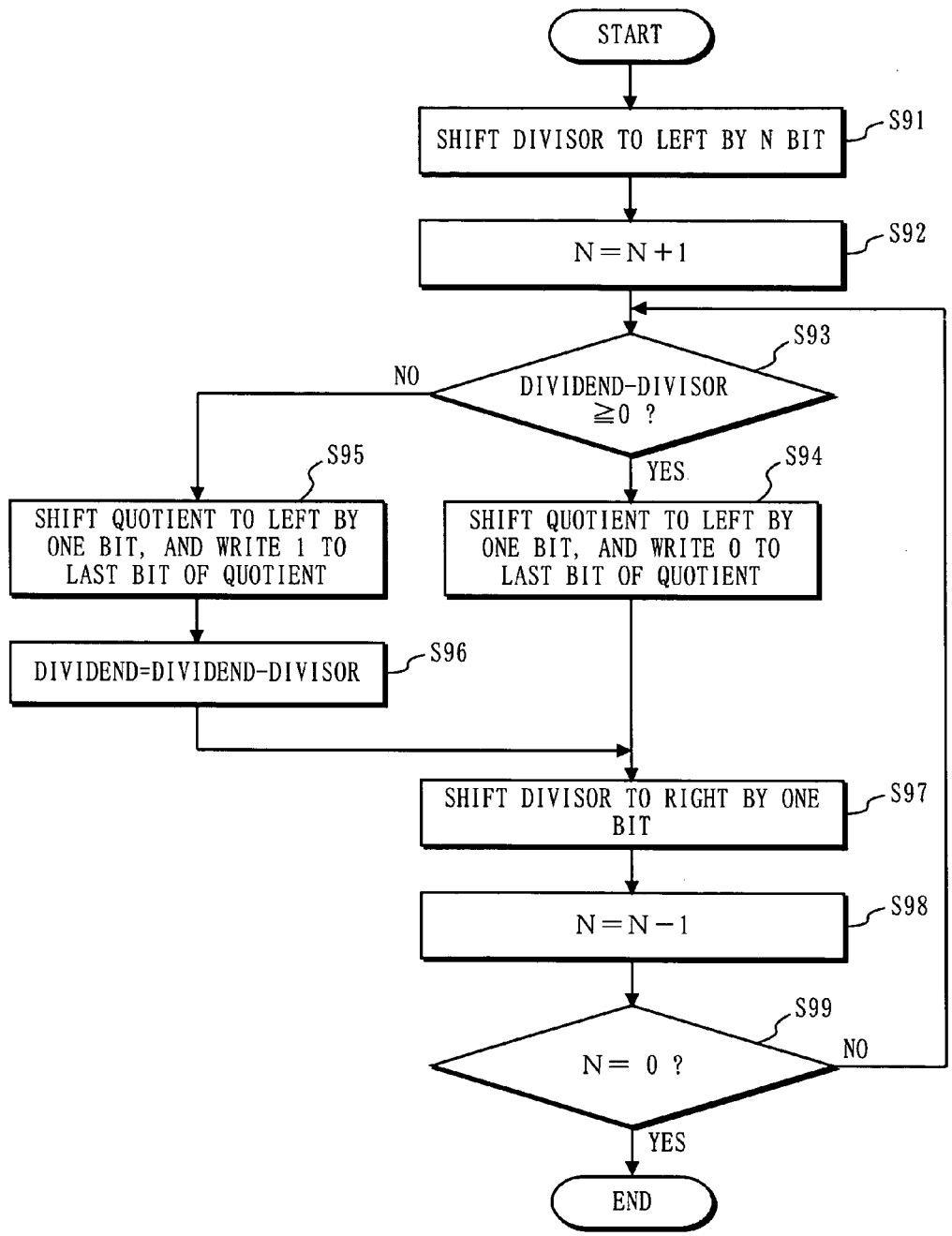
FIG. 18 is a flowchart showing a flow of a division process.

Note that, in addition to the above-described variants, there may be the following variants. That is, as shown in FIG. 14, in the case where a virtual position is represented by a distance L from the goal line (third variant), a first virtual position may be set to the position P1 through which the kart passes immediately before the kart crosses the goal line (first variant). Alternatively, as shown in FIG. 15, in the case where a virtual position is represented by a distance L from the goal line (third variant), an infinitesimal distance ΔL may be calculated from the velocity vector V2.

As such, based on the illustrative embodiments, it is possible to reduce processing time of a traveling time calculation process. Also, it is possible to adjust accuracy and processing time of the traveling time calculation process.

Note that, in the present aspect, it is assumed that two points at which a traveling time is calculated are set as a start point and a goal line, respectively. However, a traveling time calculation method of the illustrative embodiments can be applied to calculating a traveling time between two arbitrary points. For example, in the case where a plurality of passing points are provided on a course from a start to a goal, the traveling time calculation program of the illustrative embodiments can be applied to calculating a lap time (traveling time) between the passing points. Also, in the present aspect, it is assumed that a goal position is represented by a goal line, but a goal position may be one point in the game space.

Also, in the above-described aspect and the variants thereof, the goal time calculation process is performed after a kart position is updated to the position P2. Here, in other embodiments, after a vector V1 is calculated, the goal time calculation process may be performed before the kart position is updated to the position P2. Specifically, the goal time calculation process may be performed between steps 2 and 3 as shown in FIG. 7. Further, a process performed after the kart crosses the goal line may be changed depending on the goal time calculation results. For example, a course or scenery displayed after the kart crosses the goal line may be changed depending on whether or not the goal time is within a predetermined time.

Also, in the above-described aspect and the variants thereof, an infinitesimal unit time is calculated as a value obtained by dividing a frame time by an integer. In other aspects, however, an infinitesimal unit time may be set to an arbitrary value shorter than a frame time. For example, in the case where it is desired to calculate a goal time to an accuracy of 1/100 (sec), an infinitesimal unit time may be set to 1/100 (sec).

As described above, it is possible to use the illustrative embodiments for measuring a traveling time between two arbitrary points.

While illustrative embodiments have been described in detail, the foregoing description is in all aspects illustrative and not restrictive. It is understood that numerous other modifications and variations can be devised without departing from the scope of the invention.

What is claimed is:

1. A computer readable storage medium storing a traveling time calculation program which causes a computer to execute a process for calculating a traveling time, by using a unit time based on which a game screen is updated, required by a movable object to travel from a first position to a second position in a game space, wherein
the traveling time calculation program causes the computer to function as:
position determination programmed logic circuitry which determines a position of the movable object using a velocity vector with every update of the game screen;
virtual position setting programmed logic circuitry which sets a virtual position between positions immediately before and after the movable object passes through the second position, and shifts the virtual position using an infinitesimal unit vector obtained by dividing a velocity vector, at the position immediately before the movable object passes through the second position, into predetermined numbers; and
traveling time calculation programmed logic circuitry which calculates a traveling time from the first position to a position immediately before or after the virtual position crosses the second position.

2. The storage medium according to claim 1, wherein
the traveling time calculation programmed logic circuitry includes estimated time calculation programmed logic circuitry which calculates, by using the unit time, an estimated traveling time of the movable object from the first position to a position through which the movable object passes immediately after passing through the second position,
the virtual position setting programmed logic circuitry includes:
initial position setting programmed logic circuitry which sets a position, through which the movable object passes immediately after passing through the second position, to an initial virtual position; and virtual position update programmed logic circuitry which repeats a virtual position update process performed for updating the virtual position to a position which is located on a line segment connecting the position, through which the movable object passes immediately before passing through the second position, and the virtual position and which is shifted from the virtual position by a predetermined distance traveled by the movable object during an infinitesimal unit time shorter than the unit time, and the traveling time calculation programmed logic circuitry includes:

determination programmed logic circuitry which determines, every time the virtual position is determined, whether or not a virtual position crosses the second position;

subtraction programmed logic circuitry which subtracts the infinitesimal unit time from the estimated traveling time when the determination programmed logic circuitry determines that the new virtual position does not cross the second position, thereby calculating a virtual traveling time at the new virtual position; and traveling time determination programmed logic circuitry which determines, once the determination programmed logic circuitry determines that the new virtual position crosses the second position, a virtual traveling time at the new virtual position, located immediately before the second position, or a virtual traveling time at the new virtual position, located immediately after the second position, as a traveling time obtained when the movable object passes through the second position.

3. The storage medium according to claim 2, wherein
the traveling time calculation program further causes the computer to function as detection programmed logic circuitry which detects that the position determined by the position determination programmed logic circuitry crosses the second position, and when the detection programmed logic circuitry detects that the movable object passes through the second position, the estimated time calculation programmed logic circuitry calculates an estimated traveling time of the movable object.

4. The storage medium according to claim 2, wherein
the infinitesimal unit time is obtained by dividing the unit time by a predetermined integer, and
the predetermined distance is obtained by dividing, by the predetermined integer, a distance between a position through which the movable object passes immediately before passing through the second position and a position through which the movable object passes immediately after passing through the second position.

5. The storage medium according to claim 2, wherein the determination programmed logic circuitry performs a determination by calculating a distance between a position of the movable object at which the movable object is located immediately after passing through the second position and the second position, and determining whether or not the calculated distance is longer than a distance between the position of the movable object at which the movable object is located immediately after passing through the second position and the virtual position.

6. The storage medium according to claim 1, wherein
the traveling time calculation programmed logic circuitry includes estimated time calculation programmed logic circuitry which calculates, by using the unit time, an estimated traveling time of the movable object from the first position to a position through which the movable object passes immediately before passing through the second position, the virtual position setting programmed logic circuitry includes:

initial position setting programmed logic circuitry which sets a position through which the movable object passes immediately before passing through the second position to an initial virtual position; and virtual position update programmed logic circuitry which repeats a virtual position update process performed for updating the virtual position to a position which is located on a line segment connecting the virtual position and the position through which the movable object passes immediately after passing through the second position and which is shifted from the virtual position by a predetermined distance traveled by the movable object during an infinitesimal unit time shorter than the unit time, and the traveling time calculation programmed logic circuitry includes:

determination programmed logic circuitry which determines whether or not a virtual position crosses the second position every time the virtual position is determined;

addition programmed logic circuitry which adds the infinitesimal unit time to the estimated traveling time when the determination programmed logic circuitry determines that the new virtual position does not cross the second position, thereby calculating a virtual traveling time at the new virtual position; and traveling time determination programmed logic circuitry which determines, when the determination programmed logic circuitry determines that the new virtual position crosses the second position, a virtual traveling time at the new virtual position located immediately before the second position or a virtual traveling time at the new virtual position located immediately after the second position as a traveling time obtained when the new virtual position crosses the second position.

7. The storage medium according to claim 6, wherein
the traveling time calculation program further causes the computer to function as detection programmed logic circuitry which detects that the position determined by the position determination programmed logic circuitry crosses the second position, and when the detection programmed logic circuitry detects that the movable object passes through the second position, the estimated time calculation programmed logic circuitry calculates an estimated traveling time of the movable object.

8. The storage medium according to claim 6, wherein
the infinitesimal unit time is obtained by dividing the unit time by a predetermined integer, and
the predetermined distance is obtained by dividing a distance, between a position through which the movable object passes immediately before passing through the second position and a position through which the movable object passes immediately after passing through the second position, by the predetermined integer.

9. The storage medium according to claim 6, wherein
the determination programmed logic circuitry performs a determination by calculating a distance between a position of the movable object at which the movable object is located immediately before passing through the second position and the second position, and determining whether or not the calculated distance is longer than a distance between the position of the movable object at which the movable object is located immediately before passing through the second position and the virtual position.

10. The storage medium according to claim 1, wherein the traveling time calculation programmed logic circuitry includes:
   estimated time calculation programmed logic circuitry which calculates an estimated traveling time, by using the unit time, of the movable object from the first position to a position through which the movable object passes immediately after passing through the second position; and
   subtraction programmed logic circuitry which repeats a subtraction process for subtracting an infinitesimal unit time shorter than the unit time from the estimated traveling time,
   the virtual position setting programmed logic circuitry calculates a virtual position indicating a position of the movable object at a virtual traveling time obtained as a result of the subtraction process for each subtraction process, and
the traveling time calculation programmed logic circuitry includes:
   determination programmed logic circuitry which determines whether or not the calculated virtual position crosses the second position every time the virtual position is calculated; and
   traveling time determination programmed logic circuitry which determines a virtual traveling time at a virtual position as a traveling time obtained when the virtual position crosses the second position, immediately before or after the determination programmed logic circuitry determines that the virtual position crosses the second position.

11. The storage medium according to claim 10, wherein the traveling time calculation program further causes the computer to function as detection programmed logic circuitry which detects that the position determined by the position determination programmed logic circuitry crosses the second position, and
when the detection programmed logic circuitry detects that the movable object passes through the second position, the estimated time calculation programmed logic circuitry calculates an estimated traveling time of the movable object.

12. The storage medium according to claim 10, wherein the infinitesimal unit time is obtained by dividing the unit time by a predetermined integer, and
the predetermined distance is obtained by dividing a distance, between a position through which the movable object passes immediately before passing through the second position and a position through which the movable object passes immediately after passing through the second position, by the predetermined integer.

13. The storage medium according to claim 10, wherein the determination programmed logic circuitry performs a determination by calculating a distance between a position of the movable object at which the movable object is located immediately after passing through the second position and the second position, and determining whether or not the calculated distance is longer than a distance between the position of the movable object at which the movable object is located immediately after passing through the second position and the virtual position.

14. The storage medium according to claim 1, wherein the traveling time calculation programmed logic circuitry includes:
   estimated time calculation programmed logic circuitry which calculates, by using the unit time, an estimated traveling time of the movable object from the first position to a position through which the movable object passes immediately before passing through the second position; and
   addition programmed logic circuitry which repeats an addition process for adding an infinitesimal unit time shorter than the unit time to the estimated traveling time,
   wherein the virtual position setting programmed logic circuitry calculates a virtual position indicating a position of the movable object at a virtual traveling time obtained as a result of the addition process for each addition process, and
the traveling time calculation programmed logic circuitry includes:
   determination programmed logic circuitry which determines whether or not the calculated virtual position crosses the second position every time the virtual position is calculated; and
   traveling time determination programmed logic circuitry which determines a virtual traveling time as a traveling time obtained when the virtual position crosses the second position, at a virtual position immediately before or after the determination programmed logic circuitry determines that the virtual position crosses the second position.

15. The storage medium according to claim 14, wherein the traveling time calculation program further causes the computer to function as detection programmed logic circuitry which detects that the position determined by the position determination programmed logic circuitry crosses the second position, and
once the detection programmed logic circuitry detects that the movable object passes through the second position, the estimated time calculation programmed logic circuitry calculates an estimated traveling time of the movable object.

16. The storage medium according to claim 14, wherein the infinitesimal unit time is obtained by dividing the unit time by a predetermined integer, and
the predetermined distance is obtained by dividing a distance, between a position through which the movable object passes immediately before passing through the second position and a position through which the movable object passes immediately after passing through the second position, by the predetermined integer.

17. The storage medium according to claim 14, wherein the determination programmed logic circuitry performs a determination by calculating a distance between a position of the movable object at which the movable object is located immediately before passing through the second position and the second position, and determining whether or not the calculated distance is longer than a distance between the position of the movable object at which the movable object is located immediately before passing through the second position and the virtual position.

18. A game apparatus for calculating, by using a unit time based on which a game screen is updated, a traveling time required by a movable object to travel from a first position to a second position in a game space, comprising:

position determination programmed logic circuitry which determines a position of the movable object using a velocity vector with every update of the game screen;

virtual position setting programmed logic circuitry which sets a virtual position between positions immediately before and after the movable object passes through the second position, and shifts the virtual position using an infinitesimal unit vector obtained by dividing a velocity vector, at the position immediately before the movable object passes through the second position, into predetermined numbers; and traveling time calculation programmed logic circuitry which calculates a traveling time from the first position to a position immediately before or after the virtual position crosses the second position.

19. The game apparatus according to claim 18, wherein the traveling time calculation programmed logic circuitry includes estimated time calculation programmed logic circuitry which calculates, by using the unit time, an estimated traveling time of the movable object from the first position to a position through which the movable object passes immediately after passing through the second position, the virtual position setting programmed logic circuitry includes:
initial position setting programmed logic circuitry which sets a position, through which the movable object passes immediately after passing through the second position, to an initial virtual position; and
virtual position update programmed logic circuitry which repeats a virtual position update process performed for updating the virtual position to a position which is located on a line segment connecting the position through which the movable object passes immediately before passing through the second position and the virtual position and which is shifted from the virtual position by a predetermined distance traveled by the movable object during an infinitesimal unit time shorter than the unit time, and the traveling time calculation programmed logic circuitry includes:
determination programmed logic circuitry which determines whether or not a virtual position crosses the second position every time the virtual position is determined;
subtraction programmed logic circuitry which subtracts the infinitesimal unit time from the estimated traveling time when the determination programmed logic circuitry determines that the new virtual position does not cross the second position, thereby calculating a virtual traveling time at the new virtual position; and
traveling time determination programmed logic circuitry which determines, when the determination programmed logic circuitry determines that the new virtual position crosses the second position, a virtual traveling time at the new virtual position located immediately before the second position, or a virtual traveling time at the new virtual position located immediately after the second position, as a traveling time obtained when the movable object passes through the second position.

20. The game apparatus according to claim 18, wherein the traveling time calculation programmed logic circuitry includes estimated time calculation programmed logic circuitry which calculates, by using the unit time, an estimated traveling time of the movable object from the first position to a position through which the movable object passes immediately before passing through the second position, the virtual position setting programmed logic circuitry includes:
initial position setting programmed logic circuitry which sets a position, through which the movable object passes immediately before passing through the second position, to an initial virtual position; and
virtual position update programmed logic circuitry which repeats a virtual position update process performed for updating the virtual position to a position which is located on a line segment connecting the virtual position and the position through which the movable object passes immediately after passing through the second position and which is advanced from the virtual position by a predetermined distance traveled by the movable object during an infinitesimal unit time shorter than the unit time, and the traveling time calculation programmed logic circuitry includes:
determination programmed logic circuitry which determines whether or not a virtual position crosses the second position every time the virtual position is determined;
addition programmed logic circuitry which adds the infinitesimal unit time to the estimated traveling time when the determination programmed logic circuitry determines that the new virtual position does not cross the second position, thereby calculating a virtual traveling time at the new virtual position; and
traveling time determination programmed logic circuitry which determines, when the determination programmed logic circuitry determines that the new virtual position crosses the second position, a virtual traveling time at the new virtual position located immediately before the second position or a virtual traveling time at the new virtual position located immediately after the second position as a traveling time obtained when the new virtual position crosses the second position.

21. The game apparatus according to claim 18, wherein the traveling time calculation programmed logic circuitry includes:
estimated time calculation programmed logic circuitry which calculates an estimated traveling time, by using the unit time, of the movable object from the first position to a position through which the movable object passes immediately after passing through the second position; and
subtraction programmed logic circuitry which repeats a subtraction process for subtracting an infinitesimal unit time shorter than the unit time from the estimated traveling time, the virtual position setting programmed logic circuitry calculates, for each subtraction process, a virtual position indicating a position of the movable object at a virtual traveling time obtained as a result of the subtraction process, and the traveling time calculation programmed logic circuitry includes:
determination programmed logic circuitry which determines whether or not the calculated virtual position crosses the second position every time the virtual position is calculated; and traveling time determination programmed logic circuitry which determines a virtual traveling time, at a virtual position immediately before or after the determination programmed logic circuitry determines that the virtual position crosses the second position, as a traveling time obtained when the virtual position crosses the second position.

22. The game apparatus according to claim 18, wherein the traveling time calculation programmed logic circuitry includes:
   estimated time calculation programmed logic circuitry which calculates, by using the unit time, an estimated traveling time of the movable object between the first position and a position through which the movable object passes immediately before passing through the second position; and
   addition programmed logic circuitry which repeats an addition process for adding an infinitesimal unit time shorter than the unit time to the estimated traveling time,
   the virtual position setting programmed logic circuitry calculates, for each addition process, a virtual position indicating a position of the movable object at a virtual traveling time obtained as a result of the addition process, and
   the traveling time calculation programmed logic circuitry includes:
   determination programmed logic circuitry which determines whether or not the calculated virtual position crosses the second position every time the virtual position is calculated; and
   traveling time determination programmed logic circuitry which determines, as a traveling time obtained when the virtual position crosses the second position, a virtual traveling time at a virtual position immediately before or after the determination programmed logic circuitry determines that the virtual position crosses the second position.

23. The storage medium according to claim 1, wherein the traveling time is shown on the game screen.

24. The game apparatus according to claim 18, wherein the traveling time is shown on the game screen.

* * * * *